(12) United States Patent
Ibrahim et al.

(10) Patent No.: US 10,142,714 B2
(45) Date of Patent: *Nov. 27, 2018

(54) APPARATUSES AND METHODS FOR ACOUSTICALLY EXCITING A FACE PANEL OF A STOWAGE BIN INSIDE A VEHICLE

(71) Applicant: The Boeing Company, Chicago, IL (US)

(72) Inventors: Yakentim Ibrahim, Everett, WA (US); Kevin S. Callahan, Everett, WA (US); Michael Alan Feinberg, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,872

(22) Filed: Mar. 5, 2018

(65) Prior Publication Data

US 2018/0199122 A1 Jul. 12, 2018

Related U.S. Application Data

(63) Continuation of application No. 15/282,816, filed on Sep. 30, 2016, now Pat. No. 9,936,272.

(51) Int. Cl.
| | | |
|---|---|---|
| *H04R 1/02* | (2006.01) | |
| *B60R 7/04* | (2006.01) | |
| *B60R 11/02* | (2006.01) | |
| *H04R 23/02* | (2006.01) | |
| *H04R 1/28* | (2006.01) | |

(52) U.S. Cl.
CPC ............. *H04R 1/025* (2013.01); *B60R 7/04* (2013.01); *B60R 11/0205* (2013.01); *H04R 23/02* (2013.01); *H04R 1/288* (2013.01)

(58) Field of Classification Search
CPC .......... H04R 1/02; H04R 23/02; H04R 1/288; B60R 7/04; B60R 11/0205; G01P 15/18
See application file for complete search history.

(56) References Cited

U.S. PATENT DOCUMENTS

| | | |
|---|---|---|
| 4,392,027 A | 7/1983 | Bock |
| 6,215,884 B1 | 9/1995 | Parrella |
| 6,320,967 B1 | 11/2001 | Azima et al. |
| 6,324,294 B1 | 11/2001 | Azima et al. |
| 6,377,695 B1 | 4/2002 | Azima et al. |
| 6,764,046 B2 | 7/2004 | Itakura et al. |
| 7,088,836 B1 | 8/2006 | Bachmann et al. |
| 8,139,795 B2 | 10/2006 | Scheel et al. |
| 8,989,430 B2 | 3/2015 | Grenzing et al. |
| 9,154,862 B2 | 10/2015 | Cheung |
| 9,334,054 B2 | 5/2016 | Hashberger et al. |
| 2003/0053644 A1 | 3/2003 | Vandersteen |

(Continued)

OTHER PUBLICATIONS

Ibrahim et al., "Apparatuses and Methods for Acoustically Exciting a Face Panel of a Stowage Bin Inside a Vehicle," U.S. Appl. No. 15/282,816, filed Sep. 30, 2016, 66 pages.

*Primary Examiner* — Brenda C Bernardi
(74) *Attorney, Agent, or Firm* — Yee & Associates, P.C.

(57) ABSTRACT

A media system for a vehicle having a chassis comprises an electroacoustic transducer, integrated into a face panel of a stowage bin inside the vehicle. The stowage bin comprises a mounting structure that is stationary relative to the chassis of the vehicle. An interior of the stowage bin is accessible via the face panel. The face panel is movably coupled to the mounting structure.

25 Claims, 15 Drawing Sheets

(56) References Cited

U.S. PATENT DOCUMENTS

| | | |
|---|---|---|
| 2013/0208490 A1 | 8/2013 | Savian |
| 2015/0003639 A1 | 1/2015 | Cheung |
| 2015/0069182 A1 | 3/2015 | Jacobsen et al. |
| 2015/0329207 A1 | 11/2015 | Funk et al. |
| 2016/0297523 A1 | 10/2016 | Walton et al. |

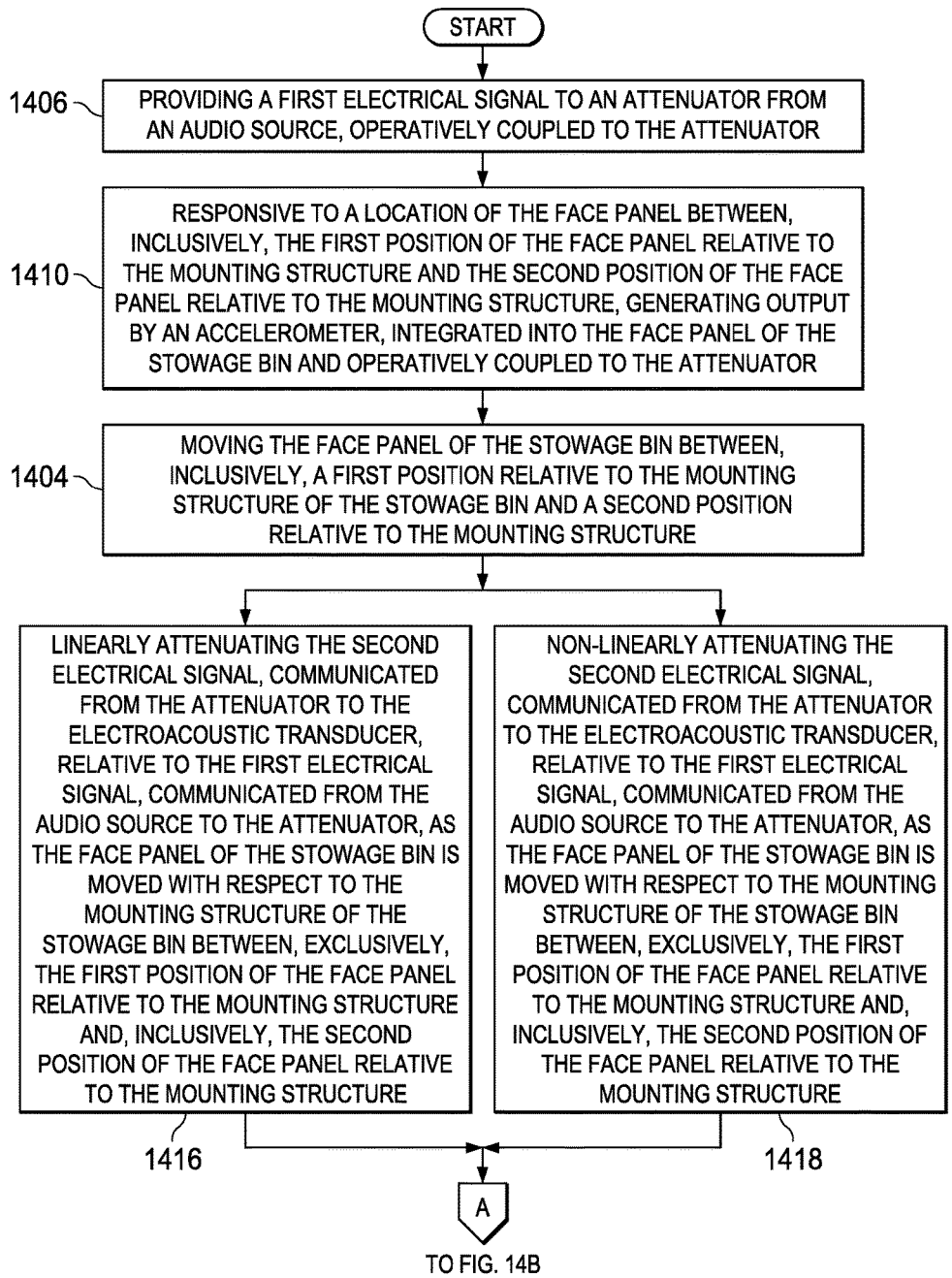

APPARATUSES AND METHODS FOR ACOUSTICALLY EXCITING A FACE PANEL OF A STOWAGE BIN INSIDE A VEHICLE

CROSS REFERENCE TO RELATED APPLICATIONS

This application is a continuation of prior co-pending U.S. patent application Ser. No. 15/282,816 filed Sep. 30, 2016, status allowed, the entire disclosure of which is incorporated by reference herein.

TECHNICAL FIELD

The present disclosure relates to media systems for vehicles.

BACKGROUND

Flat panel speaker technology is often used to provide audio for environments in which a premium is placed on physical space and component weight, such as in an aircraft. However, vibration of surfaces that have been traditionally utilized for flat panel speaker technology often render those surfaces incompatible with the incorporation of other systems that may be sensitive to vibration.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a media system for a vehicle having a chassis. The media system comprises an electroacoustic transducer, integrated into a face panel of a stowage bin inside the vehicle. The stowage bin comprises a mounting structure that is stationary relative to the chassis of the vehicle. An interior of the stowage bin is accessible via the face panel. The face panel is movably coupled to the mounting structure.

Use of the media system that includes the electroacoustic transducer, as set forth above, enables positioning the electroacoustic transducer in the face panel of the stowage bin inside a vehicle, such as an airplane. Positioning the electroacoustic transducer in the face panel of the stowage bin enables other surfaces inside the vehicle to be utilized for other functionalities. The face panel is movably coupled to the mounting structure and provides access to the interior of the stowage bin.

Another example of the subject matter according to the invention relates to a vehicle, comprising a chassis and a passenger compartment. The passenger compartment comprises ceiling panels. The vehicle also comprises a stowage bin in the passenger compartment. The stowage bin comprises a mounting structure that is stationary relative to the chassis. The stowage bin also comprises a face panel, movably coupled to the mounting structure. The stowage bin additionally comprises an interior, accessible via the face panel. The vehicle further comprises a media system. The media system comprises a high-definition display system, integrated into the ceiling panels. The media system also comprises an audio source, operatively coupled with the high-definition display system. The media system additionally comprises an electroacoustic transducer, integrated into the face panel of the stowage bin.

Use of the media system that includes the electroacoustic transducer, as set forth above, in a vehicle, such as an airplane, enables positioning the electroacoustic transducer in the face panel of the stowage bin inside the vehicle. Positioning the electroacoustic transducer the in face panel of the stowage bin enables other surfaces inside the vehicle, such as the ceiling panels of the passenger compartment of the vehicle, to be utilized for other functionalities, such as the high-definition display system, integrated into the ceiling panels of the passenger compartment.

Yet another example of the subject matter according to the invention relates to a method of acoustically exciting a face panel of a stowage bin inside a vehicle. The method comprises exciting the face panel with an electroacoustic transducer, integrated into the face panel of the stowage bin. The stowage bin further comprises a mounting structure that is stationary relative to a chassis of the vehicle. The stowage bin also comprises an interior, accessible via the face panel.

The method enables acoustic excitation of the face panel of the stowage bin via the electroacoustic transducer positioned therein. Implementing the method enables utilization of other surfaces inside the vehicle for other functionalities.

BRIEF DESCRIPTION OF THE DRAWINGS

Figure 1:
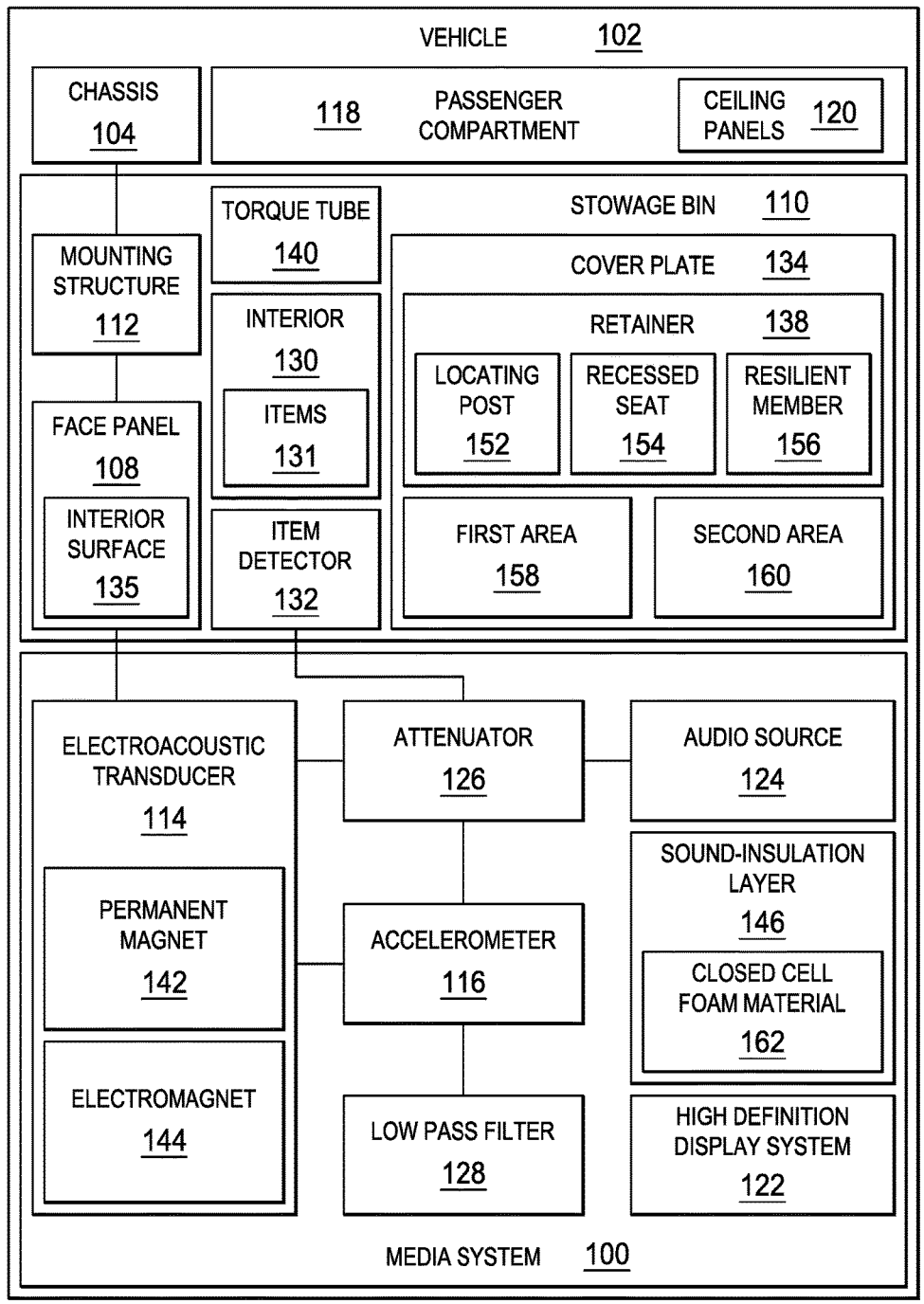
Figure 2:
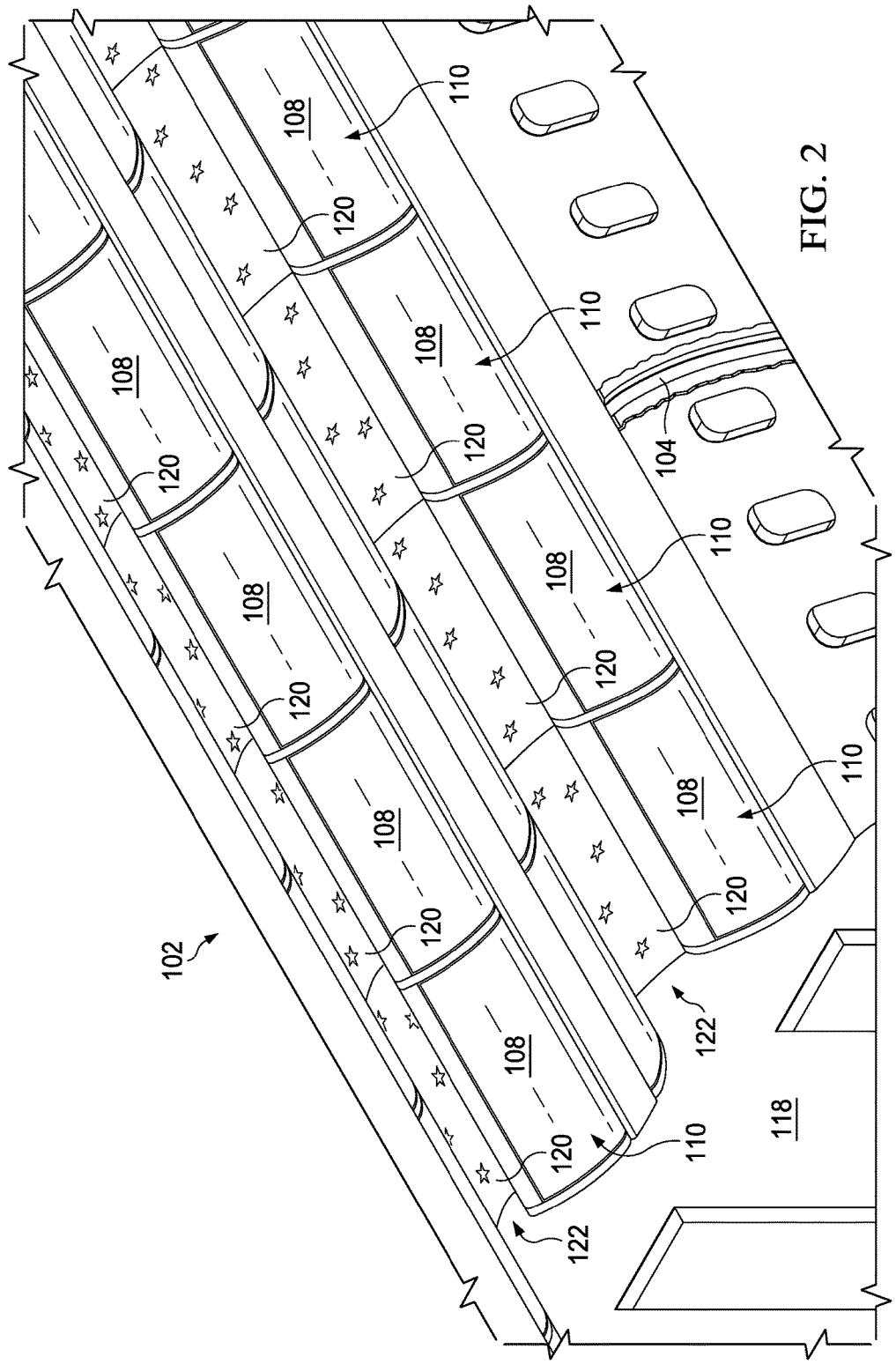
Figure 3:
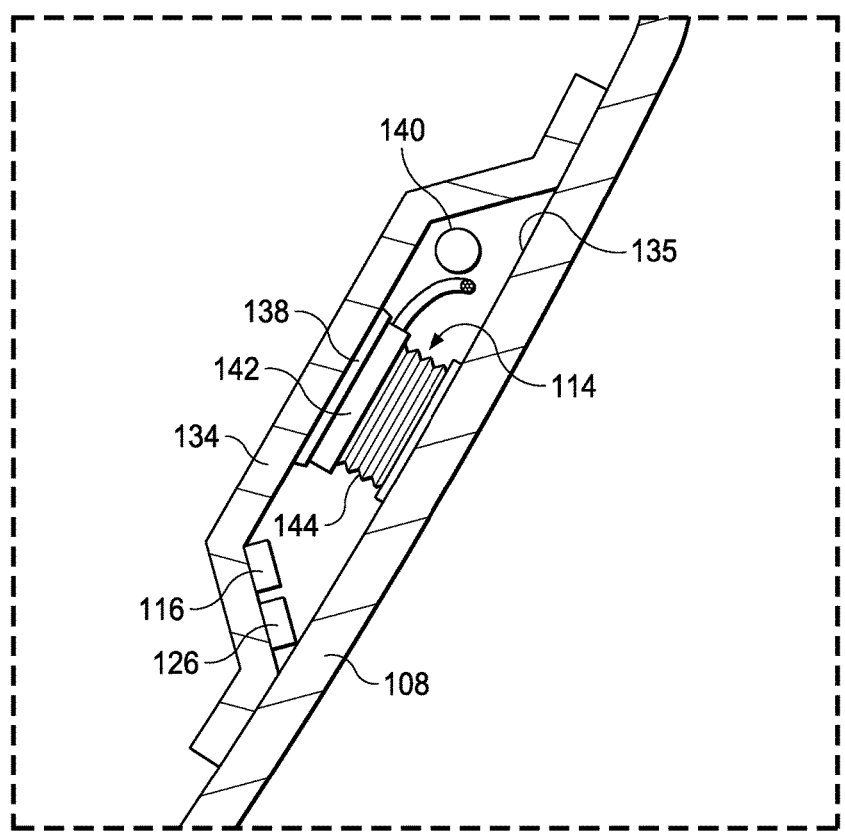
Figure 4:
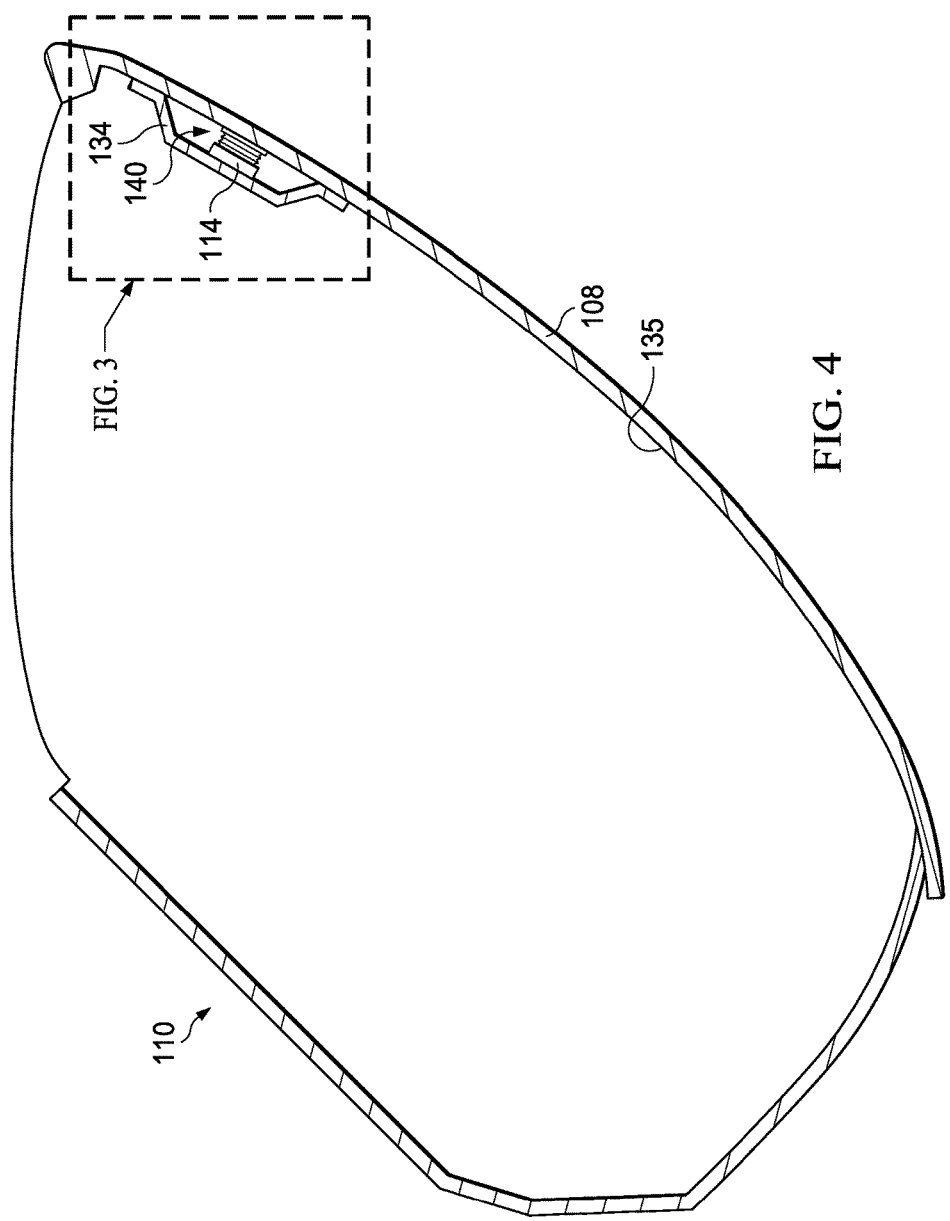
Figure 5:
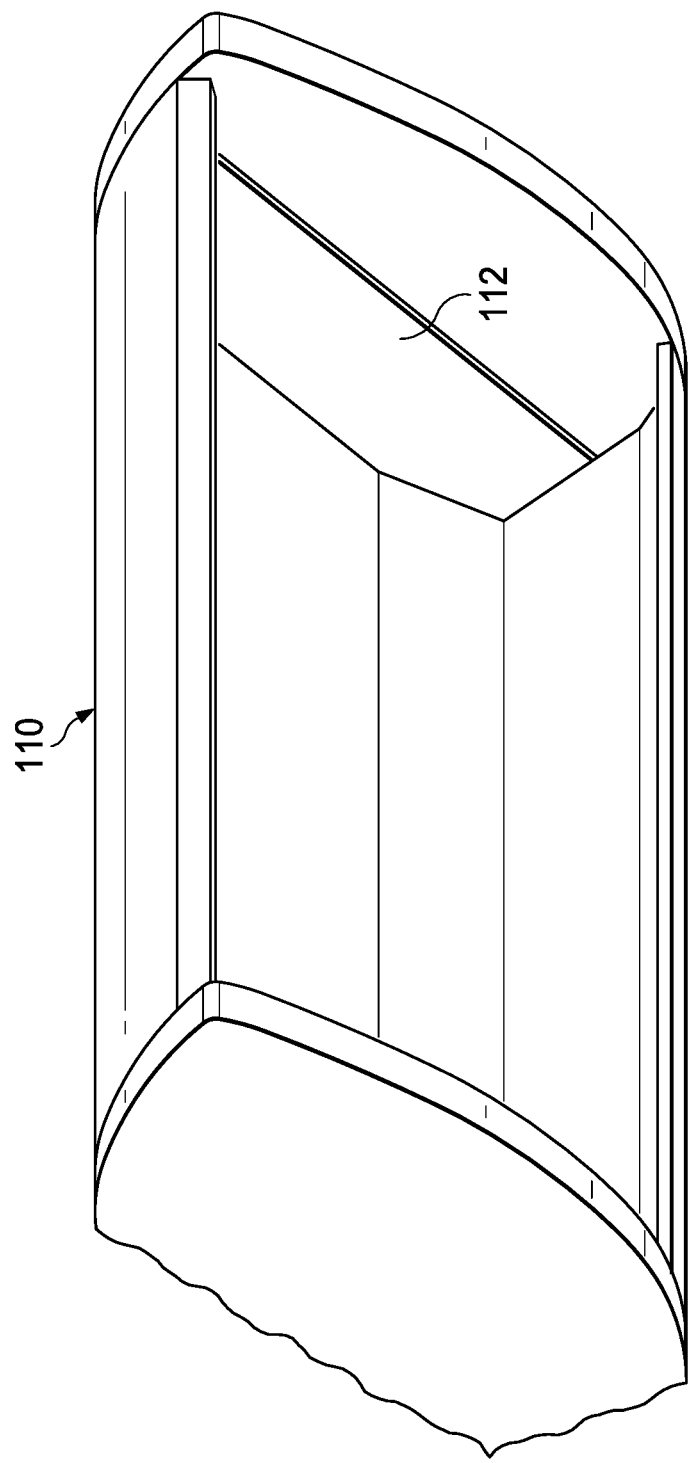
Figure 6:
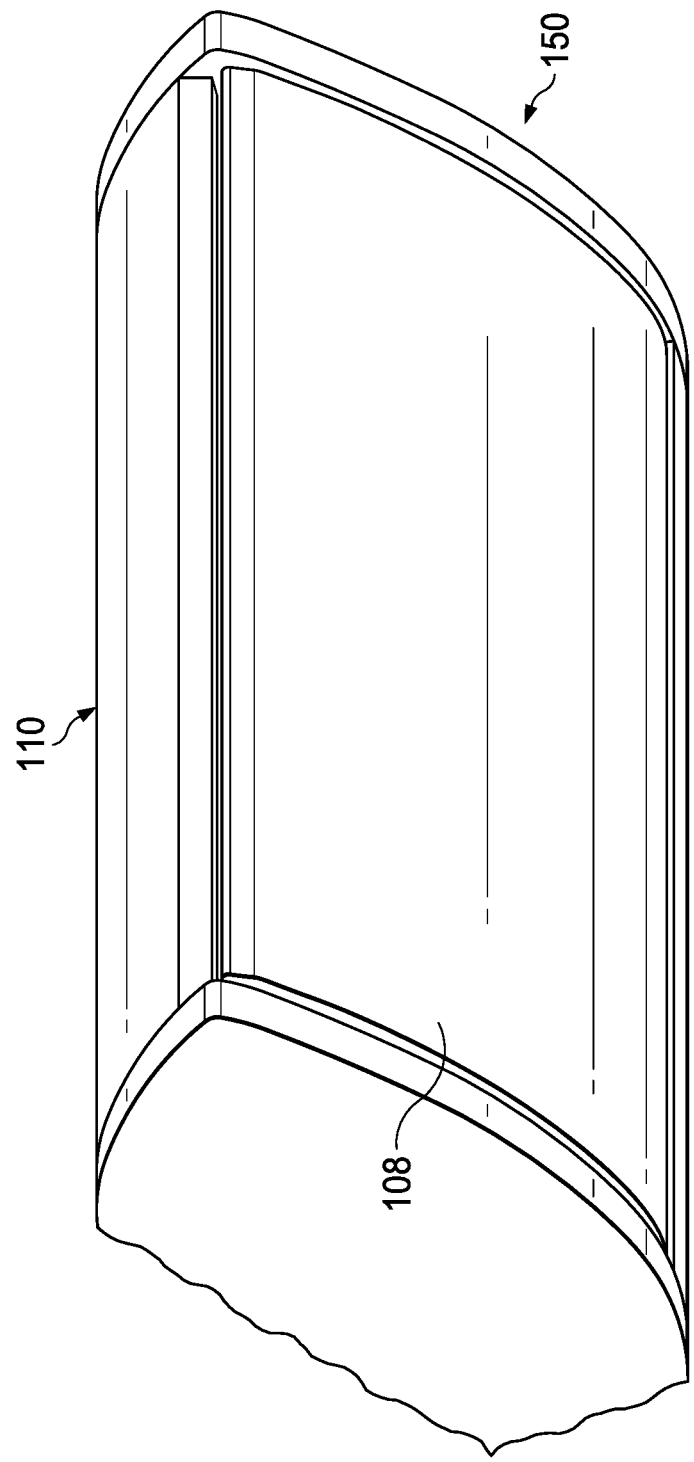
Figure 7:
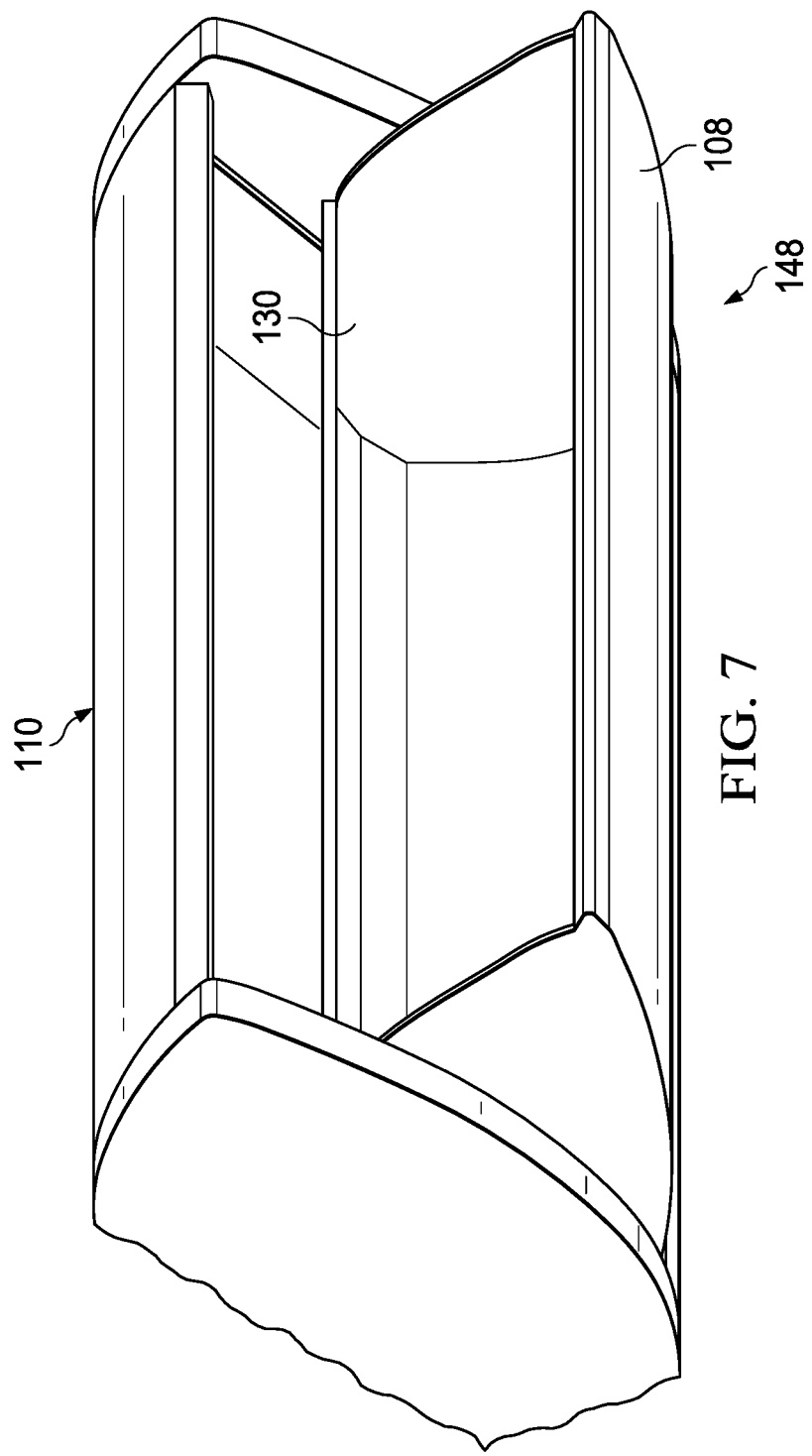
Figure 8:
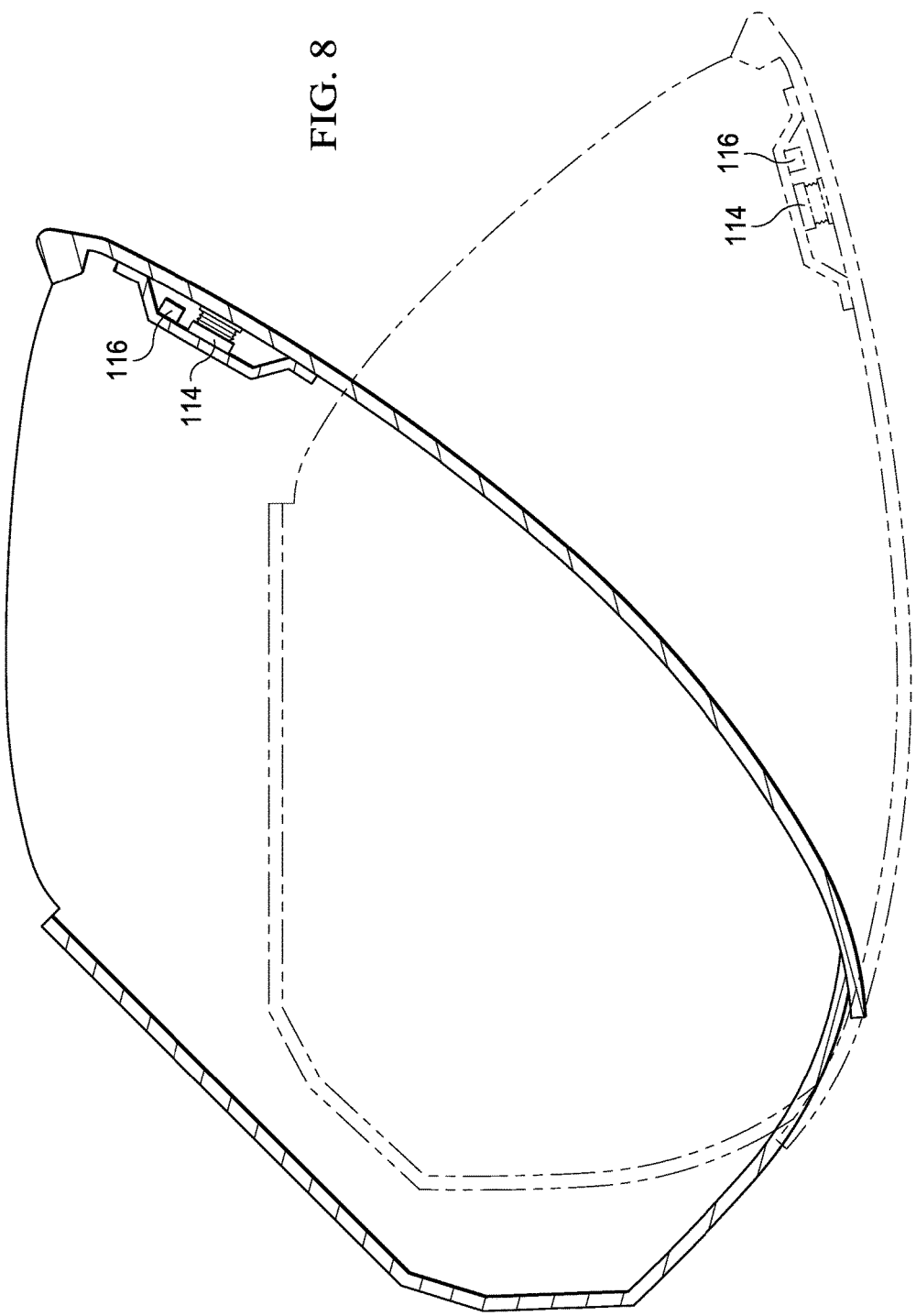
Figure 9:
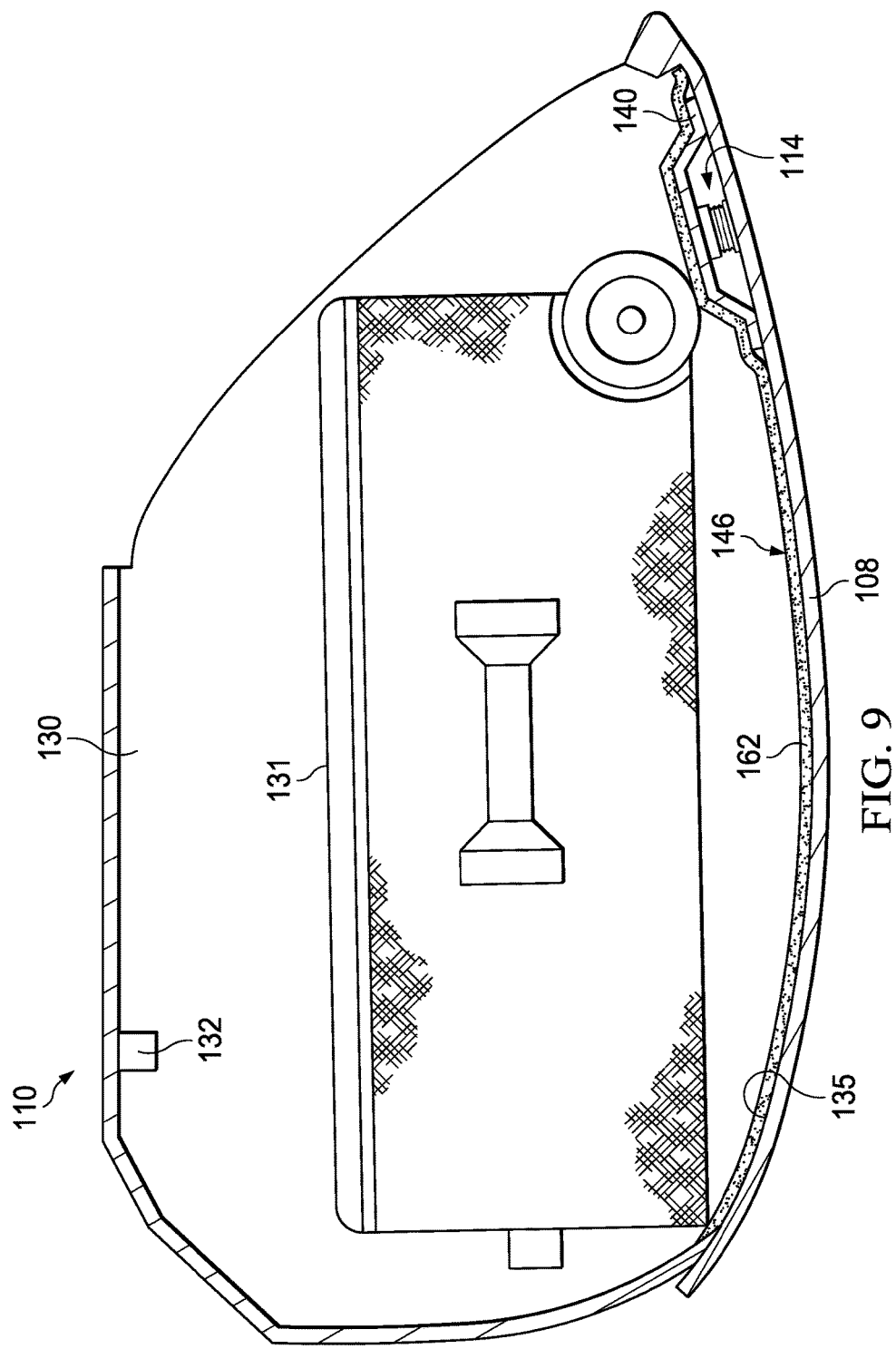
Figure 10:
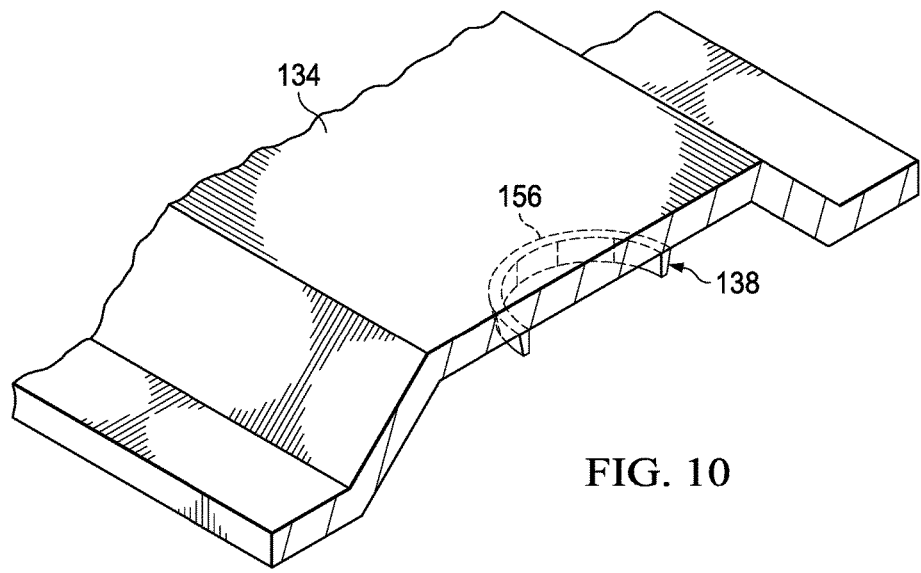
Figure 11:
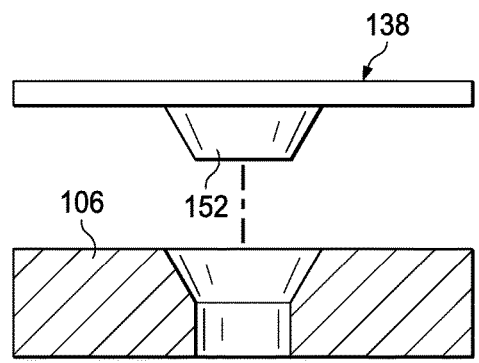
Figure 12:
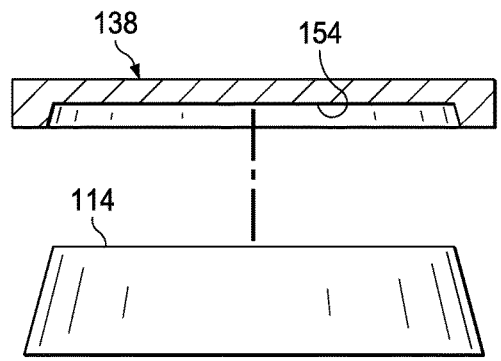
Figure 13:
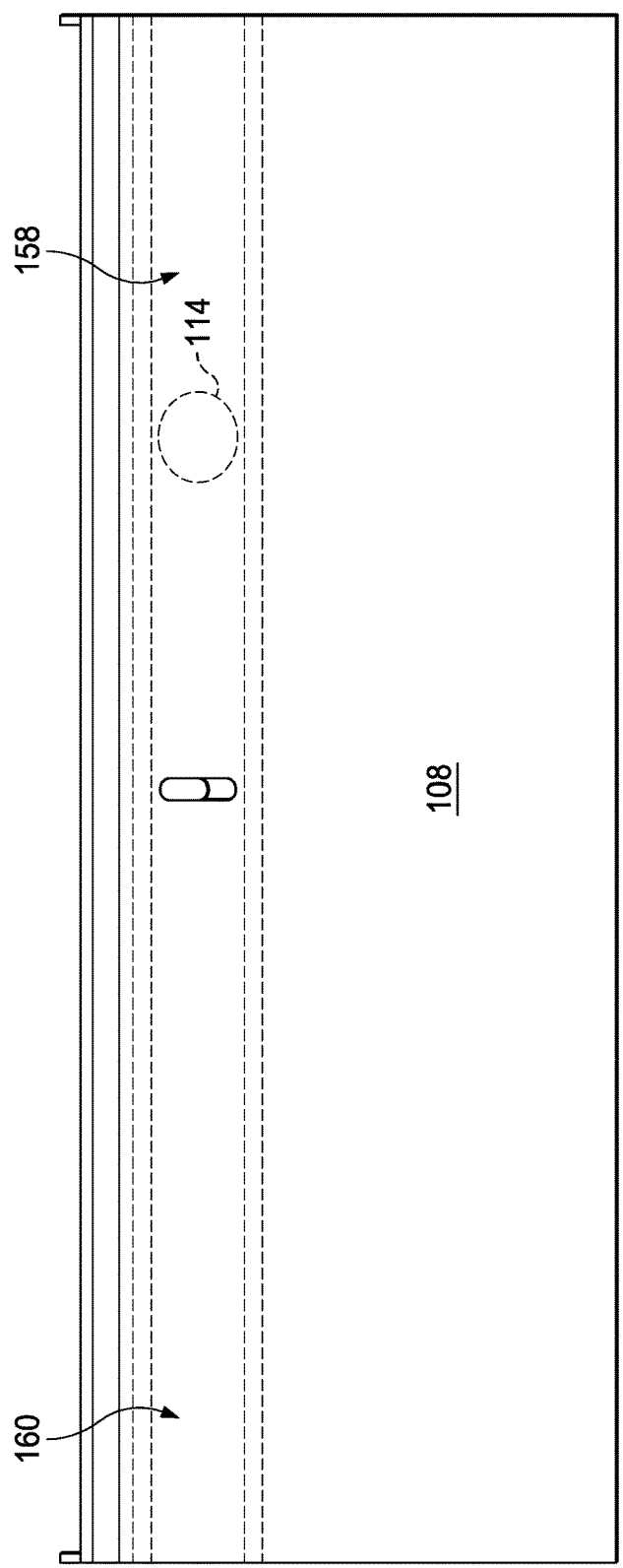
Figure 14B:
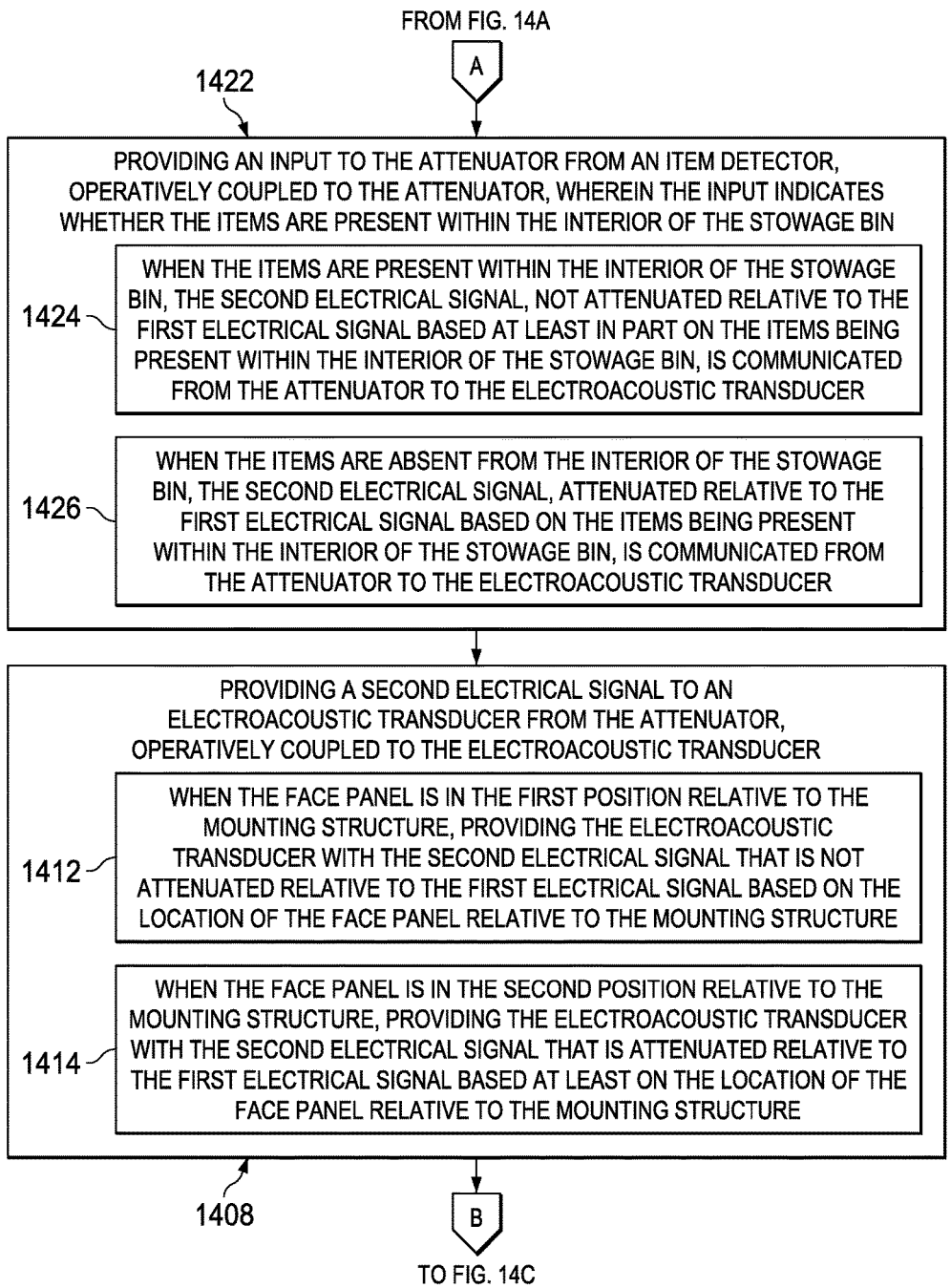
Figure 14C:
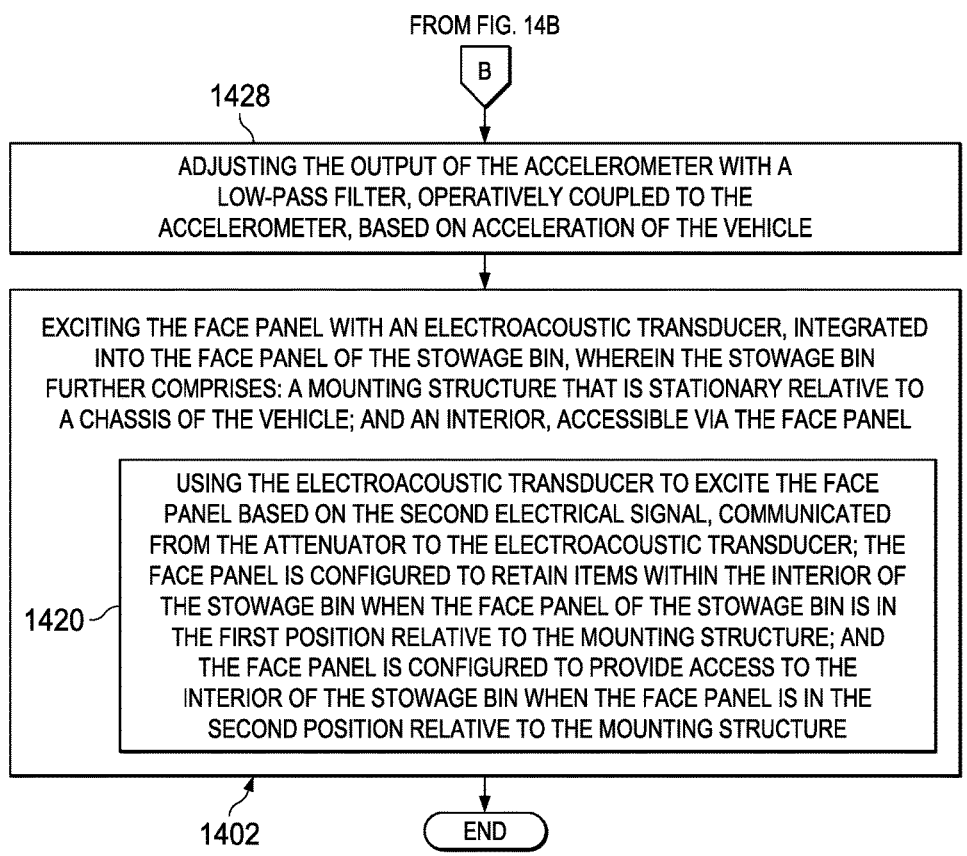
Figure 15:
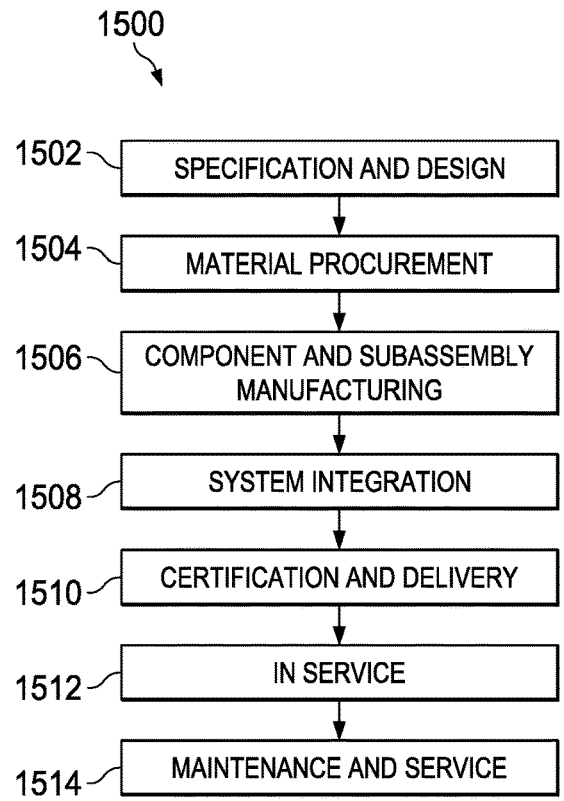

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a vehicle having a media system, according to one or more examples of the present disclosure;

FIG. 2 is a perspective view of a vehicle having a media system, according to one or more examples of the present disclosure;

FIG. 3 is a cross-sectional view of an electroacoustic transducer, according to one or more examples of the present disclosure;

FIG. 4 is a cross-sectional view of an electroacoustic transducer integrated into a face panel of a stowage bin inside vehicle, according to one or more examples of the present disclosure;

FIG. 5 is a perspective view of a mounting structure for a stowage bin, according to one or more examples of the present disclosure;

FIG. 6 is a perspective view of a stowage bin having a face panel shown in a first position with respect to the mounting structure, according to one or more of the present disclosure;

FIG. 7 is a perspective view of a stowage bin having a face panel shown in a second position with respect to the mounting structure, according to one or more examples of the present disclosure;

FIG. 8 is a cross-sectional view of a stowage bin having an accelerometer coupled to the electroacoustic transducer and integrated into a face panel, according to one or more examples of the present disclosure;

FIG. 9 is a cross-sectional view of a stowage bin having an item therein, according to one or more examples of the present disclosure;

FIG. 10 is a perspective view of a cover plate for a stowage bin having a retainer configured to locate the electroacoustic transducer along the cover plate, according to one or more examples of the present disclosure;

FIG. 11 is a cross-sectional view of a retainer shown according to an illustrative embodiment and configured to locate the electroacoustic transducer along the cover plate, according to one or more examples of the present disclosure;

FIG. 12 is a cross-sectional view of a retainer shown according to an illustrative embodiment and configured to locate the electroacoustic transducer along the cover plate, according to one or more examples of the present disclosure;

FIG. 13 is a perspective view of a cover plate having locally tailored physical characteristics, according to one or more examples of the present disclosure;

FIGS. 14A, 14B, and 14C are a block diagram of a method of utilizing the media system of FIG. 1, according to one or more examples of the present disclosure;

FIG. 15 is a block diagram of aircraft production and service methodology; and

Figure 16:
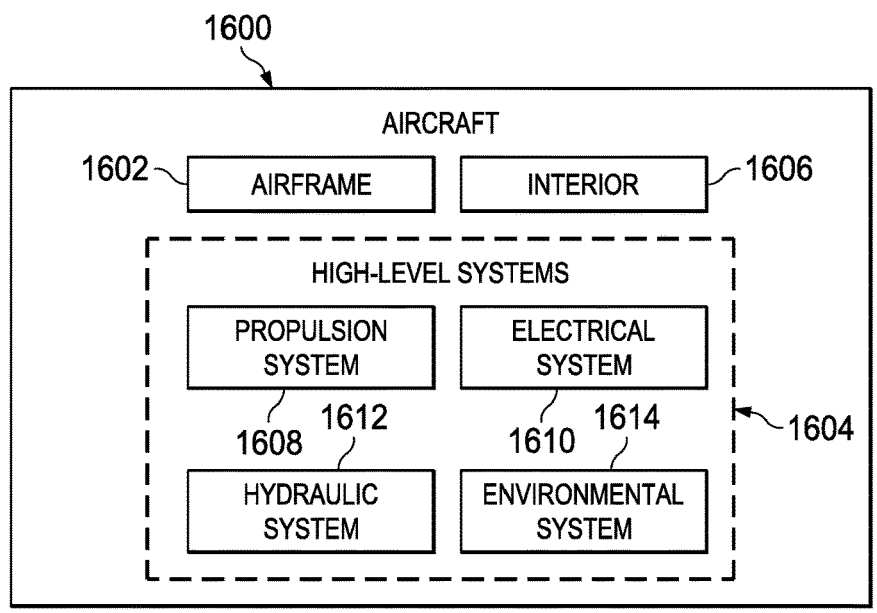

FIG. 16 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 15 and 16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 15 and 16 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-7, media system 100 for vehicle 102 having chassis 104 is disclosed. Media system 100 comprises electroacoustic transducer 114, integrated into face panel 108 of stowage bin 110 inside vehicle 102. Stowage bin 110 comprises mounting structure 112 that is stationary relative to chassis 104 of vehicle 102. Interior 130 of stowage bin 110 is accessible via face panel 108. Face panel 108 is movably coupled to mounting structure 112. The preceding subject matter of this paragraph characterizes example 1 of the present disclosure.

Use of media system 100 that includes electroacoustic transducer 114, as set forth above, enables positioning electroacoustic transducer 114 in face panel 108 of stowage bin 110 inside vehicle 102, such as an airplane. Positioning electroacoustic transducer 114 in face panel 108 of stowage bin 110 enables other surfaces inside vehicle 102 to be utilized for other functionalities. Face panel 108 is movably coupled to mounting structure 112 and provides access to interior 130 of stowage bin 110.

For example, electroacoustic transducer 114 integrated in face panel 108 allows surfaces previously utilized for flat-panel speaker technology to be repurposed for other functions, such as providing a high-definition display inside vehicle 102. By positioning electroacoustic transducer 114 in face panel 108 of stowage bin 110, media system 100 allows face panel 108 of stowage bin 110 to function as a flat-panel speaker while also providing access to interior 130 of stowage bin 110.

Referring generally to FIG. 1 and particularly to, e.g., FIGS. 6-7, face panel 108 of stowage bin 110 is capable of being moved between, inclusively, a first position relative to mounting structure 112 of stowage bin 110 and a second position relative to mounting structure 112. The preceding subject matter of this paragraph characterizes example 2 of the present disclosure, wherein example 2 also includes the subject matter according to example 1, above.

Allowing face panel 108 of stowage bin 110 to move between a first position relative to mounting structure 112 of stowage bin and second position relative to mounting structure 112 allows face panel 108 of stowage bin 110 to function as a flat-panel speaker while also providing access to interior 130 of stowage bin 110. Electroacoustic transducer 114 integrated in face panel 108 of stowage bin 110 while retaining the item-securing functionality of face panel 108 of retaining items within stowage bin 110 when face panel 108 is moved between a first position relative to mounting structure 112 of stowage bin and second position relative to mounting structure 112.

Referring generally to FIG. 1 and particularly to, e.g., FIGS. 3 and 8, media system 100 further comprises attenuator 126, operatively coupled to electroacoustic transducer 114. Media system 100 also comprises audio source 124, operatively coupled to attenuator 126. Media system 100 additionally comprises accelerometer 116, integrated into face panel 108 of stowage bin 110 and operatively coupled to attenuator 126. Audio source 124 is configured to provide a first electrical signal to attenuator 126. Attenuator 126 is configured to provide a second electrical signal to electroacoustic transducer 114. The preceding subject matter of this paragraph characterizes example 3 of the present disclosure, wherein example 3 also includes the subject matter according to example 2, above.

Use of media systems, such as media system 100 including attenuator 126, allows for a second electrical signal, that may be different from a first electrical signal provided by audio source 124 to attenuator 126, to be provided to electroacoustic transducer 114. For example, when audio source 124 provides a first electrical signal to attenuator 126, attenuator 126 provides a second electrical signal to electroacoustic transducer 114. Use of attenuator 126 allows attenuated electrical signals, different from the first electrical signal sent from audio source 124, to drive electroacoustic transducer 114.

Accelerometer 116 is integrated into face panel 108 of stowage bin 110 and operatively coupled to attenuator 126. When coupled with attenuator 126, accelerometer 116 allows attenuated electrical signals to drive electroacoustic transducer 114 based on output from accelerometer 116 to attenuator 126.

Referring generally to FIG. 1 and particularly to, e.g., FIGS. 3-4 and 6-8, accelerometer 116 is configured to generate output responsive to a location of face panel 108 of stowage bin 110 between, inclusively, the first position of face panel 108 relative to mounting structure 112 and the second position of face panel 108 relative to mounting structure 112. The preceding subject matter of this paragraph characterizes example 4 of the present disclosure, wherein example 4 also includes the subject matter according to example 3, above.

By configuring accelerometer 116 to generate output responsive to a location of face panel 108 of stowage bin 110, attenuator 126 can provide an electrical signal to electroacoustic transducer 114 based on a location of face panel 108 relative to mounting structure 112. When coupled with attenuator 126, accelerometer 116 allows different electrical signals to drive electroacoustic transducer 114 based a location of face panel 108 relative to mounting structure 112.

In one illustrative example, accelerometer 116 may be a multiaxis accelerometer, capable of measuring acceleration in multiple directions. In this manner, accelerometer 116 detects acceleration as a vector quantity, and can be used to sense orientation of accelerometer 116. When integrated into face panel 108 of stowage bin 110, accelerometer 116 allows for the determination of a position of face panel 108, including, inclusively, the first position of face panel 108 relative to mounting structure 112 and the second position of face panel 108 relative to mounting structure 112.

Referring generally to FIG. 1 and particularly to, e.g., FIGS. 3-4 and 6-8, when face panel 108 is in the first position relative to mounting structure 112, attenuator 126 provides electroacoustic transducer 114 with the second electrical signal that is not attenuated relative to the first electrical signal, communicated from audio source 124 to attenuator 126, based on the location of face panel 108 relative to mounting structure 112. When face panel 108 is in the second position relative to mounting structure 112, attenuator 126 provides electroacoustic transducer 114 with the second electrical signal that is attenuated relative to the first electrical signal, communicated from audio source 124 to attenuator 126, at least based on the location of face panel 108 relative to mounting structure 112. The preceding subject matter of this paragraph characterizes example 5 of the present disclosure, wherein example 5 also includes the subject matter according to example 4, above.

Use of accelerometer 116 integrated into face panel 108 of stowage bin 110 allows attenuator 126 to provide different electrical signals based on position of face panel 108 relative to mounting structure 112. In one illustrative example, when face panel 108 is in the first position relative to mounting structure 112, attenuator 126 provides an electrical signal that is not attenuated relative to the first electrical signal from audio source 124 based on the location of face panel 108. In another illustrative example, when face panel 108 is in the second position relative to mounting structure 112, attenuator 126 provides an electrical signal that is attenuated relative to the first signal from audio source 124 based on the location of face panel 108. In this manner, accelerometer 116 allows media system 100 to provide attenuated audio to vehicle 102 based on a position of face panel 108 relative to mounting structure 112.

Referring generally to FIG. 1 and particularly to, e.g., FIGS. 3-4 and 6-8, responsive to face panel 108 of stowage bin 110 being moved with respect to mounting structure 112 of stowage bin 110 between, exclusively, the first position of face panel 108 relative to mounting structure 112 and, inclusively, the second position of face panel 108 relative to mounting structure 112, the second electrical signal, communicated from attenuator 126 to electroacoustic transducer 114, is linearly attenuated relative to the first electrical signal, communicated from audio source 124 to attenuator 126. The preceding subject matter of this paragraph characterizes example 6 of the present disclosure, wherein example 6 also includes the subject matter according to example 5, above.

In one illustrative example, attenuator 126 linearly attenuates the second electrical signal relative to the first electrical signal as face panel 108 of stowage bin 110 is moved between the first position and the second position. A linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 3-4 and 6-8, responsive to face panel 108 of stowage bin 110 being moved with respect to mounting structure 112 of stowage bin 110 between, exclusively, the first position of face panel 108 relative to mounting structure 112 and, inclusively, the second position of face panel 108 relative to mounting structure 112, the second electrical signal, communicated from attenuator 126 to electroacoustic transducer 114, is non-linearly attenuated relative to the first electrical signal, communicated from audio source 124 to attenuator 126. The preceding subject matter of this paragraph characterizes example 7 of the present disclosure, wherein example 7 also includes the subject matter according to example 5, above.

In one illustrative example, attenuator 126 non-linearly attenuates the second electrical signal relative to the first electrical signal as face panel 108 of stowage bin 110 is moved between the first position and the second position. A non-linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 3-4 and 6-8, electroacoustic transducer 114 is configured to excite face panel 108 of stowage bin 110 based on the second electrical signal, communicated from attenuator 126 to electroacoustic transducer 114. The preceding subject matter of this paragraph characterizes example 8 of the present disclosure, wherein example 8 also includes the subject matter according to any one of examples 5 to 7, above.

Exciting face panel 108 of stowage bin 110 based on the second electrical signal provides for selective excitement of face panel 108 by electroacoustic transducer 114 relative to the electrical signal received from attenuator 126. In this manner, a media system, such as media system 100, can provide different excitation of face panel 108 of stowage bin 110 based on the position of face panel 108. For example, electroacoustic transducer 114 can selectively excite face panel 108 according to a second electrical signal when face panel 108 is in second position relative to mounting structure 112.

Referring generally to FIG. 1 and particularly to, e.g., FIGS. 6-9, face panel 108 of stowage bin 110 is configured to retain items 131 within interior 130 of stowage bin 110 when face panel 108 is in the first position. Face panel 108 is configured to provide access to interior 130 of stowage bin 110 when face panel 108 is in the second position. The preceding subject matter of this paragraph characterizes example 9 of the present disclosure, wherein example 9 also includes the subject matter according to example 8, above.

When in the first position, face panel 108 of stowage bin 110 is configured to retain items 131 within interior 130 of stowage bin 110. When in the second position, face panel 108 of stowage bin 110 is configured to provide access to interior 130 of stowage bin 110. Allowing face panel 108 of stowage bin 110 to move between a first position relative to mounting structure 112 of stowage bin and second position relative to mounting structure 112 allows face panel 108 of stowage bin 110 to function as a flat-panel speaker while also providing access to interior 130 of stowage bin 110. Electroacoustic transducer 114 integrated in face panel 108 of stowage bin 110 while retaining the item-securing functionality of face panel 108 of retaining items within stowage bin 110 when face panel 108 is moved between a first position relative to mounting structure 112 of stowage bin and second position relative to mounting structure 112.

Referring generally to FIG. 1 and particularly to, e.g., FIGS. 6-9, stowage bin 110 further comprises item detector 132, operatively coupled to attenuator 126. Item detector 132 is configured to provide an input to attenuator 126, indicating whether items 131 are present within interior 130 of stowage bin 110. The preceding subject matter of this paragraph characterizes example 10 of the present disclosure, wherein example 10 also includes the subject matter according to example 9, above.

Item detectors, such as item detector 132, may be incorporated into stowage bin 110. Item detector 132 indicates to attenuator 126 whether items 131 are present within interior 130 of stowage and 110. By configuring item detector 132 to generate output responsive to the presence of items 131 which in interior 130 of stowage bin 110, attenuator 126 can provide an electrical signal to electroacoustic transducer 114 based on the presence of items 131 within interior 130 of stowage bin 110. When coupled with attenuator 126, item detector 132 allows different electrical signals to drive electroacoustic transducer 114 based the presence of items 131 within interior 130 of stowage bin 110.

Referring generally to FIG. 1 and particularly to, e.g., FIGS. 3-4 and 6-9, when items 131 are present within interior 130 of stowage bin 110, the input from item detector 132 causes attenuator 126 to provide electroacoustic transducer 114 with the second electrical signal that is not attenuated, at least based on the input from item detector 132 to attenuator 126, relative to the first electrical signal, communicated from audio source 124 to attenuator 126. When items 131 are absent from interior 130 of stowage bin 110, attenuator 126 provides electroacoustic transducer 114 with the second electrical signal that is attenuated, based on the input from item detector 132 to attenuator 126, relative to the first electrical signal, communicated from audio source 124 to attenuator 126. The preceding subject matter of this paragraph characterizes example 11 of the present disclosure, wherein example 11 also includes the subject matter according to example 10, above.

Use of item detector 132 in stowage bin 110 allows attenuator 126 to provide different electrical signals based on the presence of items 131 within interior 130 of stowage bin 110. In one illustrative example, when items 131 are absent from interior 130 of stowage bin 110, attenuator 126 provides an electrical signal that is attenuated relative to the first electrical signal from audio source 124 based on the location of face panel 108. In another illustrative example, when items 131 are present within interior 130 of stowage bin 110, attenuator 126 provides an electrical signal that is not attenuated relative to the first signal from audio source 124 based on the location of face panel 108. In this manner, accelerometer 116 allows media system 100 to provide attenuated audio to vehicle 102 based on a position of face panel 108 relative to mounting structure 112.

Referring generally to FIG. 1 and particularly to, e.g., FIGS. 3-4, media system 100 further comprises low-pass filter 128, operatively coupled to accelerometer 116. Low-pass filter 128 is configured to adjust the output of accelerometer 116 based on acceleration of vehicle 102. The preceding subject matter of this paragraph characterizes example 12 of the present disclosure, wherein example 12 also includes the subject matter according to any one of examples 4 to 11, above.

When operatively coupled to accelerometer 116, low-pass filter 128 allows media system 100 to adjust the output of accelerometer 116 based on acceleration of vehicle 102. In this manner, low-pass filter 128 prevents inadvertent attenuation or non-attenuation of the first electrical signal based due to accelerometer 116 detecting acceleration of vehicle 102.

Referring generally to FIG. 1 and particularly to, e.g., FIG. 3, cover plate 134 is secured to interior surface 135 of face panel 108 of stowage bin 110. Torque tube 140 is retained between cover plate 134 and face panel 108. Electroacoustic transducer 114 is retained between cover plate 134 and face panel 108. The preceding subject matter of this paragraph characterizes example 13 of the present disclosure, wherein example 13 also includes the subject matter according to any one of examples 1 to 12, above.

Torque tube 140 is retained between cover plate 134 and face panel 108, and is provided to secure face panel 108 in first position relative to mounting structure 112. Cover plate 134 is secured to interior surface 135 of face panel 108 of stowage bin 110. By retaining electroacoustic transducer 114 between cover plate 134 and face panel 108, existing structures of stowage bin 110 are used to protect and conceal electroacoustic transducer 114 within face panel 108 without adding additional parts or weight to vehicle 102.

Referring generally to FIG. 1 and particularly to, e.g., FIGS. 3, and 10-12, cover plate 134 further comprises retainer 138. Retainer 138 is configured to locate electroacoustic transducer 114 along cover plate 134. The preceding subject matter of this paragraph characterizes example 14 of the present disclosure, wherein example 14 also includes the subject matter according to example 13, above.

When cover plate 134 includes retainer 138, electroacoustic transducer 114 can be easily located along cover plate 134 in a position selected to provide a desired level of acoustic performance when exciting face panel 108.

Referring generally to FIG. 1 and particularly to, e.g., FIGS. 3 and 10-12, retainer 138 comprises one of locating post 152, recessed seat 154, resilient finger 156, or any combination thereof. The preceding subject matter of this paragraph characterizes example 15 of the present disclosure, wherein example 15 also includes the subject matter according to example 14, above.

When retainer 138 is one of locating post 152, recessed seat 154, resilient finger 156, or any combination thereof, electroacoustic transducer 114 can be easily located along cover plate 134 in a position selected to provide a desired level of acoustic performance when exciting face panel 108.

Referring generally to FIG. 1 and particularly to, e.g., FIG. 3, electroacoustic transducer 114 further comprises permanent magnet 142, located relative to cover plate 134 by retainer 138. Additionally, electroacoustic transducer 114 comprises electromagnet 144, connected to interior surface 135 of face panel 108 and in contact with permanent magnet 142. The preceding subject matter of this paragraph characterizes example 16 of the present disclosure, wherein example 16 also includes the subject matter according to any one of examples 14 to 15, above.

In one illustrative example, electroacoustic transducer 114 comprises permanent magnet 142, located relative to cover plate 134 by retainer 138 and electromagnet 144, connected to interior surface 135 of face panel 108 and in contact with permanent magnet 142. Permanent magnet 142, located relative to cover plate 134 and electromagnet 144, connected to interior surface 135 of face panel 108, allows electroacoustic transducer 114 to provide a desired level of acoustic performance when exciting face panel 108.

Referring generally to FIG. 1 and particularly to, e.g., FIG. 3, electromagnet 144 is a voice coil wire. The preceding subject matter of this paragraph characterizes example 17 of the present disclosure, wherein example 17 also includes the subject matter according to example 16, above.

In one illustrative example, electromagnet 144 is a voice coil wire. When electromagnet 144 is a voice coil, electroacoustic transducer 114 provides a desired level of acoustic performance when exciting face panel 108.

Referring generally to FIG. 1 and particularly to, e.g., FIG. 3, electromagnet 144 is connected to interior surface 135 of face panel 108 using a flexible adhesive. The preceding subject matter of this paragraph characterizes example 18 of the present disclosure, wherein example 18 also includes the subject matter according to any one of examples 16 to 17, above.

When electromagnet 144 is connected to interior surface 135 of face panel 108 using a flexible adhesive, electroacoustic transducer 114 can be easily secured to interior surface 135 of face panel 108 in a position selected to provide a desired level of acoustic performance when exciting face panel 108.

Referring generally to FIG. 1 and particularly to, e.g., FIGS. 3, and 13, cover plate 134 further comprises first area 158, proximately located to electroacoustic transducer 114. First area 158 has a first locally tailored physical characteristic selected to provide an acoustic property. Additionally, cover plate 134 comprises second area 160, distally located from electroacoustic transducer 114. A second physical characteristic of second area 160 is different from the first locally tailored physical characteristic of first area 158. The preceding subject matter of this paragraph characterizes example 19 of the present disclosure, wherein example 19 also includes the subject matter according to any one of examples 13 to 18, above.

By tailoring characteristics of different areas of cover plate 134, each area can be specifically designed to impart desired physical properties that may be more pertinent to that particular area. For example, when cover plate 134 further comprises first area 158 proximately located to electroacoustic transducer 114, a first physical characteristic of first area 158 may be locally tailored to provide an acoustic property. Additionally, second area 160 of cover plate 134, distally located from electroacoustic transducer 114, may have a second physical characteristic that different from the first locally tailored physical characteristic of first area 158. For example, first area 158 may have a first physical characteristic, such as a stiffness, designed to optimize acoustic performance of electroacoustic transducer 114. Second area 160 may have a second physical characteristic, such as a stiffness, designed to optimize impact resistance or durability of cover plate 134.

Referring generally to FIG. 1 and particularly to, e.g., FIGS. 3 and 9, media system 100 further comprises sound-insulation layer 146, positioned over at least a portion of cover plate 134 to acoustically isolate electroacoustic transducer 114 from interior 130 of stowage bin 110. The preceding subject matter of this paragraph characterizes example 20 of the present disclosure, wherein example 20 also includes the subject matter according to any one of examples 13 to 19, above.

When sound-insulation layer 146 is positioned over at least a portion of cover plate 134, electroacoustic transducer 114 can be acoustically isolated from interior 130 of stowage bin 110 to provide a desired level of acoustic performance when exciting face panel 108.

Referring generally to FIG. 1 and particularly to, e.g., FIGS. 3 and 9, sound-insulation layer 146 comprises closed-cell foam material 162. The preceding subject matter of this paragraph characterizes example 21 of the present disclosure, wherein example 21 also includes the subject matter according to example 20, above.

When sound-insulation layer 146 comprises closed-cell foam material 162, electroacoustic transducer 114 can be acoustically isolated from interior 130 of stowage bin 110 to provide a desired level of acoustic performance when exciting face panel 108. In one illustrative example, closed-cell foam material 162 is a viscoelastic polyurethane foam.

Referring generally to FIG. 1 and particularly to, e.g., FIG. 2, media system 100 further comprises high-definition display system 122, integrated into ceiling panels 120 of passenger compartment 118 of vehicle 102. High-definition display system 122 is operatively coupled with audio source 124. The preceding subject matter of this paragraph characterizes example 22 of the present disclosure, wherein example 22 also includes the subject matter according to any one of examples 3 to 21, above.

Use of media systems, such as media system 100 including electroacoustic transducer 114 as set forth above, allows for positioning of electroacoustic transducer 114 in face panel 108 of stowage bin 110 inside vehicle 102, such as an airplane. By positioning electroacoustic transducer 114 in face panel 108 of stowage bin 110, media system 100 allows other surfaces inside vehicle 102, such as ceiling panels 120 of passenger compartment 118 of vehicle 102, to be utilized for other functionalities, such as high-definition display system 122, integrated into ceiling panels 120 of passenger compartment 118.

For example, electroacoustic transducer 114 integrated in face panel 108 allows ceiling panels 120 of passenger compartment 118 of vehicle 102, previously utilized for flat-panel speaker technology, to be repurposed for other high-definition display system 122, integrated into ceiling panels 120 of passenger compartment 118. By positioning electroacoustic transducer 114 in face panel 108 of stowage bin 110, media system 100 allows face panel 108 of stowage bin 110 to function as a flat-panel speaker while also allowing the integration of high-definition display system 122 into ceiling panels 120 of passenger compartment 118.

Referring generally to FIG. 1 and particularly to, e.g., FIGS. 2-7, vehicle 102 is disclosed. Vehicle 102 comprises chassis 104 and passenger compartment 118. Passenger compartment 118 comprises ceiling panels 120. Vehicle 102 additionally comprises stowage bin 110 in passenger compartment 118. Stowage bin 110 comprises mounting structure 112 that is stationary relative to chassis 104. Stowage bin 110 also comprises face panel 108, movably coupled to mounting structure 112. Additionally, stowage bin 110 comprises interior 130, accessible via face panel 108. Vehicle 102 further comprises media system 100. Media system 100 comprises high-definition display system 122, integrated into ceiling panels 120. Media system 100 also comprises audio source 124, operatively coupled with high-definition display system 122. Media system 100 additionally comprises electroacoustic transducer 114, integrated into face panel 108 of stowage bin 110. The preceding subject matter of this paragraph characterizes example 23 of the present disclosure.

Use of media system 100 that includes electroacoustic transducer 114 as set forth above, in vehicle 102, such as an airplane, enables positioning electroacoustic transducer 114 in face panel 108 of stowage bin 110 inside vehicle 102. Positioning electroacoustic transducer 114 in face panel 108 of stowage bin 110 enables other surfaces inside vehicle 102, such as ceiling panels 120 of passenger compartment 118 of vehicle 102, to be utilized for other functionalities, such as high-definition display system 122, integrated into ceiling panels 120 of passenger compartment 118.

For example, electroacoustic transducer 114 integrated in face panel 108 enables ceiling panels 120 of passenger compartment 118 of vehicle 102, previously utilized for flat-panel speaker technology, to be repurposed for other high-definition display system 122, integrated into ceiling panels 120 of passenger compartment 118. By positioning electroacoustic transducer 114 in face panel 108 of stowage bin 110, media system 100 enables face panel 108 of stowage bin 110 to function as a flat-panel speaker while also enabling the integration of high-definition display system 122 into ceiling panels 120 of passenger compartment 118.

Referring generally to FIG. 1 and particularly to, e.g., FIGS. 6-7, face panel 108 of stowage bin 110 is capable of being moved between, inclusively, a first position relative to mounting structure 112 of stowage bin 110 and a second position relative to mounting structure 112. The preceding subject matter of this paragraph characterizes example 24 of the present disclosure, wherein example 24 also includes the subject matter according to example 23, above.

Allowing face panel 108 of stowage bin 110 to move between a first position relative to mounting structure 112 of stowage bin and second position relative to mounting structure 112 allows face panel 108 of stowage bin 110 to function as a flat-panel speaker while also providing access to interior 130 of stowage bin 110. Electroacoustic transducer 114 integrated in face panel 108 of stowage bin 110 while retaining the item-securing functionality of face panel 108 of retaining items within stowage bin 110 when face panel 108 is moved between a first position relative to mounting structure 112 of stowage bin and second position relative to mounting structure 112.

Referring generally to FIG. 1 and particularly to, e.g., FIGS. 3 and 8, media system 100 of vehicle 102 further comprises attenuator 126, operatively coupled to electroacoustic transducer 114, and accelerometer 116, integrated into face panel 108 of stowage bin 110 and operatively coupled to attenuator 126. Audio source 124 is configured to provide a first electrical signal to attenuator 126. Attenuator 126 is configured to provide a second electrical signal to electroacoustic transducer 114. The preceding subject matter of this paragraph characterizes example 25 of the present disclosure, wherein example 25 also includes the subject matter according to example 24, above.

Use of media system 100 including attenuator 126, in vehicle 102 allows for a second electrical signal, that may be different from a first electrical signal provided by audio source 124 to attenuator 126, to be provided to electroacoustic transducer 114. For example, when audio source 124 provides a first electrical signal to attenuator 126, attenuator 126 provides a second electrical signal to electroacoustic transducer 114. Use of attenuator 126 allows attenuated electrical signals, different from the first electrical signal sent from audio source 124, to drive electroacoustic transducer 114.

Accelerometer 116 is integrated into face panel 108 of stowage bin 110 and operatively coupled to attenuator 126. When coupled with attenuator 126, accelerometer 116 allows attenuated electrical signals to drive electroacoustic transducer 114 based on output from accelerometer 116 to attenuator 126.

Referring generally to FIG. 1 and particularly to, e.g., FIGS. 3-4 and 6-8, accelerometer 116 is configured to generate output responsive to a location of face panel 108 of stowage bin 110 between, inclusively, the first position of face panel 108 relative to mounting structure 112 and the second position of face panel 108 relative to mounting structure 112. The preceding subject matter of this paragraph characterizes example 26 of the present disclosure, wherein example 26 also includes the subject matter according to example 25, above.

By configuring accelerometer 116 to generate output responsive to a location of face panel 108 of stowage bin 110, attenuator 126 can provide an electrical signal to electroacoustic transducer 114 based on a location of face panel 108 relative to mounting structure 112. When coupled with attenuator 126, accelerometer 116 allows different electrical signals to drive electroacoustic transducer 114 based a location of face panel 108 relative to mounting structure 112.

In one illustrative example, accelerometer 116 may be a multiaxis accelerometer, capable of measuring acceleration in multiple directions. In this manner, accelerometer 116 detects acceleration as a vector quantity, and can be used to sense orientation of accelerometer 116. When integrated into face panel 108 of stowage bin 110, accelerometer 116 allows for the determination of a position of face panel 108, including, inclusively, the first position of face panel 108 relative to mounting structure 112 and the second position of face panel 108 relative to mounting structure 112.

Referring generally to FIG. 1 and particularly to, e.g., FIGS. 3-4 and 6-8, when face panel 108 is in the first position relative to mounting structure 112, attenuator 126 provides electroacoustic transducer 114 with the second electrical signal that is not attenuated relative to the first electrical signal, communicated from audio source 124 to attenuator 126, based on the location of face panel 108 relative to mounting structure 112. When face panel 108 is in the second position relative to mounting structure 112, attenuator 126 provides electroacoustic transducer 114 with the second electrical signal that is attenuated relative to the first electrical signal, communicated from audio source 124 to attenuator 126, based on the location of face panel 108 relative to mounting structure 112. The preceding subject matter of this paragraph characterizes example 27 of the present disclosure, wherein example 27 also includes the subject matter according to example 26, above.

Use of accelerometer 116 integrated into face panel 108 of stowage bin 110 allows attenuator 126 to provide different electrical signals based on position of face panel 108 relative to mounting structure 112. In one illustrative example, when face panel 108 is in the first position relative to mounting structure 112, attenuator 126 provides an electrical signal that is not attenuated relative to the first electrical signal from audio source 124 based on the location of face panel 108. In another illustrative example, when face panel 108 is in the second position relative to mounting structure 112, attenuator 126 provides an electrical signal that is attenuated relative to the first signal from audio source 124 based on the location of face panel 108. In this manner, accelerometer 116 allows media system 100 to provide attenuated audio to vehicle 102 based on a position of face panel 108 relative to mounting structure 112.

Referring generally to FIG. 1 and particularly to, e.g., FIGS. 3-4 and 6-8, responsive to face panel 108 of stowage bin 110 being moved with respect to mounting structure 112 of stowage bin 110 between, exclusively, the first position of face panel 108 relative to mounting structure 112 and, inclusively, the second position of face panel 108 relative to mounting structure 112, the second electrical signal, communicated from attenuator 126 to electroacoustic transducer 114, is linearly attenuated relative to the first electrical signal, communicated from audio source 124 to attenuator 126. The preceding subject matter of this paragraph characterizes example 28 of the present disclosure, wherein example 28 also includes the subject matter according to any one of examples 26 to 27, above.

In one illustrative example, attenuator 126 linearly attenuates the second electrical signal relative to the first electrical signal as face panel 108 of stowage bin 110 is moved between the first position and the second position. A linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 3-4 and 6-8, responsive to face panel 108 of stowage bin 110 being moved with respect to mounting structure 112 of stowage bin 110 between, exclusively, the first position of face panel 108 relative to mounting structure 112 and, inclusively, the second position of face panel 108 relative to mounting structure 112, the second electrical signal, communicated from attenuator 126 to electroacoustic transducer 114, is non-linearly attenuated relative to the first electrical signal, communicated from audio source 124 to attenuator 126. The preceding subject matter of this paragraph characterizes example 29 of the present disclosure, wherein example 29 also includes the subject matter according to any one of examples 26 to 27, above.

In one illustrative example, attenuator 126 non-linearly attenuates the second electrical signal relative to the first electrical signal as face panel 108 of stowage bin 110 is moved between the first position and the second position. A non-linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 3-4 and 6-8, electroacoustic transducer 114 is configured to excite face panel 108 of stowage bin 110 based on the second electrical signal, communicated from attenuator 126 to electroacoustic transducer 114. The preceding subject matter of this paragraph characterizes example 30 of the present disclosure, wherein example 30 also includes the subject matter according to any one of examples 26 to 29, above.

Exciting face panel 108 of stowage bin 110 based on the second electrical signal provides for selective excitement of face panel 108 by electroacoustic transducer 114 relative to the electrical signal received from attenuator 126. In this manner, a media system, such as media system 100, can provide different excitation of face panel 108 of stowage bin 110 based on the position of face panel 108. For example, electroacoustic transducer 114 can selectively excite face panel 108 according to a second electrical signal when face panel 108 is in second position relative to mounting structure 112.

Referring generally to FIG. 1 and particularly to, e.g., FIGS. 6-9, face panel 108 of stowage bin 110 is configured to retain items 131 within interior 130 of stowage bin 110 when face panel 108 is in the first position. Face panel 108 is configured to provide access to interior 130 of stowage bin 110 when face panel 108 is in the second position. The preceding subject matter of this paragraph characterizes example 31 of the present disclosure, wherein example 31 also includes the subject matter according to example 30, above.

When in the first position, face panel 108 of stowage bin 110 is configured to retain items 131 within interior 130 of stowage bin 110. When in the second position, face panel 108 of stowage bin 110 is configured to provide access to interior 130 of stowage bin 110. Allowing face panel 108 of stowage bin 110 to move between a first position relative to mounting structure 112 of stowage bin and second position relative to mounting structure 112 allows face panel 108 of stowage bin 110 to function as a flat-panel speaker while also providing access to interior 130 of stowage bin 110. Electroacoustic transducer 114 integrated in face panel 108 of stowage bin 110 while retaining the item-securing functionality of face panel 108 of retaining items within stowage bin 110 when face panel 108 is moved between a first position relative to mounting structure 112 of stowage bin and second position relative to mounting structure 112.

Referring generally to FIG. 1 and particularly to, e.g., FIGS. 6-9, stowage bin 110 further comprises item detector 132, operatively coupled to attenuator 126. Item detector 132 is configured to provide an input to attenuator 126, indicating whether items 131 are present within interior 130 of stowage bin 110. The preceding subject matter of this paragraph characterizes example 32 of the present disclosure, wherein example 32 also includes the subject matter according to example 31, above.

Item detectors, such as item detector 132, may be incorporated into stowage bin 110. Item detector 132 indicates to attenuator 126 whether items 131 are present within interior 130 of stowage and 110. By configuring item detector 132 to generate output responsive to the presence of items 131 which in interior 130 of stowage bin 110, attenuator 126 can provide an electrical signal to electroacoustic transducer 114 based on the presence of items 131 within interior 130 of stowage bin 110. When coupled with attenuator 126, item detector 132 allows different electrical signals to drive electroacoustic transducer 114 based the presence of items 131 within interior 130 of stowage bin 110.

Referring generally to FIG. 1 and particularly to, e.g., FIGS. 3-4 and 6-9, when items 131 are present within interior 130 of stowage bin 110, the input from item detector 132 causes attenuator 126 to provide electroacoustic transducer 114 with the second electrical signal that is not attenuated, at least based on the input from item detector 132 to attenuator 126, relative to the first electrical signal, communicated from audio source 124 to attenuator 126. When items 131 are absent from interior 130 of stowage bin 110, attenuator 126 provides electroacoustic transducer 114 with the second electrical signal that is attenuated, based on the input from item detector 132 to attenuator 126, relative to the first electrical signal, communicated from audio source 124 to attenuator 126. The preceding subject matter of this paragraph characterizes example 33 of the present disclosure, wherein example 33 also includes the subject matter according to example 32, above.

Use of item detector 132 in stowage bin 110 allows attenuator 126 to provide different electrical signals based on the presence of items 131 within interior 130 of stowage bin 110. In one illustrative example, when items 131 are absent from interior 130 of stowage bin 110, attenuator 126 provides an electrical signal that is attenuated relative to the first electrical signal from audio source 124 based on the location of face panel 108. In another illustrative example, when items 131 are not present within interior 130 of stowage bin 110, attenuator 126 provides an electrical signal that is attenuated relative to the first signal from audio source 124 based on the location of face panel 108. In this manner, accelerometer 116 allows media system 100 to provide attenuated audio to vehicle 102 based on a position of face panel 108 relative to mounting structure 112.

Referring generally to FIG. 1 and particularly to, e.g., FIGS. 3-4, vehicle 102 further comprises low-pass filter 128, operatively coupled to accelerometer 116. Low-pass filter 128 is configured to adjust the output of accelerometer 116 based on acceleration of vehicle 102. The preceding subject matter of this paragraph characterizes example 34 of the present disclosure, wherein example 34 also includes the subject matter according to any one of examples 26 to 33, above.

When operatively coupled to accelerometer 116, low-pass filter 128 allows media system 100 to adjust the output of accelerometer 116 based on acceleration of vehicle 102. In this manner, low-pass filter 128 prevents inadvertent attenuation or non-attenuation of the first electrical signal based due to accelerometer 116 detecting acceleration of vehicle 102.

Referring generally to FIG. 1 and particularly to, e.g., FIG. 3, cover plate 134 is secured to interior surface 135 of face panel 108 of stowage bin 110. Torque tube 140 is retained between cover plate 134 and face panel 108. Electroacoustic transducer 114 is retained between cover plate 134 and face panel 108. The preceding subject matter of this paragraph characterizes example 35 of the present disclosure, wherein example 35 also includes the subject matter according to any one of examples 23 to 34, above.

Torque tube 140 is retained between cover plate 134 and face panel 108, and is provided to secure face panel 108 in first position relative to mounting structure 112. Cover plate 134 is secured to interior surface 135 of face panel 108 of stowage bin 110. By retaining electroacoustic transducer 114 between cover plate 134 and face panel 108, existing structures of stowage bin 110 are used to protect and conceal electroacoustic transducer 114 within face panel 108 without adding additional parts or weight to vehicle 102.

Referring generally to FIG. 1 and particularly to, e.g., FIGS. 3, and 10-12, cover plate 134 further comprises retainer 138. Retainer 138 is configured to locate electroacoustic transducer 114 along cover plate 134. The preceding subject matter of this paragraph characterizes example 36 of the present disclosure, wherein example 36 also includes the subject matter according to example 35, above.

When cover plate 134 includes retainer 138, electroacoustic transducer 114 can be easily located along cover plate 134 in a position selected to provide a desired level of acoustic performance when exciting face panel 108.

Referring generally to FIG. 1 and particularly to, e.g., FIGS. 3, and 10-12, retainer 138 comprises one of locating post 152, recessed seat 154, resilient finger 156, or any combination thereof. The preceding subject matter of this paragraph characterizes example 37 of the present disclosure, wherein example 37 also includes the subject matter according to example 36, above.

When retainer 138 is one of locating post 152, recessed seat 154, resilient finger 156, or any combination thereof, electroacoustic transducer 114 can be easily located along cover plate 134 in a position selected to provide a desired level of acoustic performance when exciting face panel 108.

Referring generally to FIG. 1 and particularly to, e.g., FIG. 3, electroacoustic transducer 114 further comprises permanent magnet 142, located relative to cover plate 134 by retainer 138. Additionally, electroacoustic transducer 114 comprises electromagnet 144, connected to interior surface 135 of face panel 108 and in contact with permanent magnet 142. The preceding subject matter of this paragraph characterizes example 38 of the present disclosure, wherein example 38 also includes the subject matter according to any one of examples 36 to 37, above.

In one illustrative example, electroacoustic transducer 114 comprises permanent magnet 142, located relative to cover plate 134 by retainer 138 and electromagnet 144, connected to interior surface 135 of face panel 108 and in contact with permanent magnet 142. Permanent magnet 142, located relative to cover plate 134 and electromagnet 144, connected to interior surface 135 of face panel 108, allows electroacoustic transducer 114 to provide a desired level of acoustic performance when exciting face panel 108.

Referring generally to FIG. 1 and particularly to, e.g., FIG. 3, electromagnet 144 is a voice coil wire. The preceding subject matter of this paragraph characterizes example 39 of the present disclosure, wherein example 39 also includes the subject matter according to example 38, above.

In one illustrative example, electromagnet 144 is a voice coil wire. When electromagnet 144 is a voice coil, electroacoustic transducer 114 provides a desired level of acoustic performance when exciting face panel 108.

Referring generally to FIG. 1 and particularly to, e.g., FIG. 3, electromagnet 144 is connected to interior surface 135 of face panel 108 using a flexible adhesive. The preceding subject matter of this paragraph characterizes example 40 of the present disclosure, wherein example 40 also includes the subject matter according to any one of examples 38 to 39, above.

When electromagnet 144 is connected to interior surface 135 of face panel 108 using a flexible adhesive, electroacoustic transducer 114 can be easily secured to interior surface 135 of face panel 108 in a position selected to provide a desired level of acoustic performance when exciting face panel 108.

Referring generally to FIG. 1 and particularly to, e.g., FIGS. 3, and 13, cover plate 134 further comprises first area 158, proximately located to electroacoustic transducer 114. First area 158 has a first locally tailored physical characteristic, selected to provide an acoustic property. Additionally, cover plate 134 comprises second area 160, distally located from electroacoustic transducer 114. A second physical characteristic of second area 160 is different from the first locally tailored physical characteristic of first area 158. The preceding subject matter of this paragraph characterizes example 41 of the present disclosure, wherein example 41 also includes the subject matter according to any one of examples 35 to 40, above.

By tailoring characteristics of different areas of cover plate 134, each area can be specifically designed to impart desired physical properties that may be more pertinent to that particular area. For example, when cover plate 134 further comprises first area 158 proximately located to electroacoustic transducer 114, a first physical characteristic of first area 158 may be locally tailored to provide an acoustic property. Additionally, second area 160 of cover plate 134, distally located from electroacoustic transducer 114, may have a second physical characteristic that different from the first locally tailored physical characteristic of first area 158. For example, first area 158 may have a first physical characteristic, such as a stiffness, designed to optimize acoustic performance of electroacoustic transducer 114. Second area 160 may have a second physical characteristic, such as a stiffness, designed to optimize impact resistance or durability of cover plate 134.

Referring generally to FIG. 1 and particularly to, e.g., FIGS. 3 and 9, vehicle 102 further comprises sound-insulation layer 146, positioned over at least a portion of cover plate 134 to acoustically isolate electroacoustic transducer 114 from interior 130 of stowage bin 110. The preceding subject matter of this paragraph characterizes example 42 of the present disclosure, wherein example 42 also includes the subject matter according to any one of examples 35 to 41, above.

When sound-insulation layer 146 is positioned over at least a portion of cover plate 134, electroacoustic transducer 114 can be acoustically isolated electroacoustic transducer 114 from interior 130 of stowage bin 110 to provide a desired level of acoustic performance when exciting face panel 108.

Referring generally to FIG. 1 and particularly to, e.g., FIGS. 3 and 9, sound-insulation layer 146 comprises closed-cell foam material 162. The preceding subject matter of this paragraph characterizes example 43 of the present disclosure, wherein example 43 also includes the subject matter according to example 42, above.

When sound-insulation layer 146 comprises closed-cell foam material 162, electroacoustic transducer 114 can be acoustically isolated electroacoustic transducer 114 from interior 130 of stowage bin 110 to provide a desired level of acoustic performance when exciting face panel 108. In one illustrative example, closed-cell foam material 162 is a viscoelastic polyurethane foam.

Referring generally to FIG. 1 and particularly to, e.g., FIGS. 14A-14C, method 1400 of acoustically exciting face panel 108 of stowage bin 110 inside vehicle 102 is disclosed. Method 1400 comprises (block 1402) exciting face panel 108 with electroacoustic transducer 114, integrated into face panel 108 of stowage bin 110. Stowage bin 110 further comprises mounting structure 112 that is stationary relative to chassis 104 of vehicle 102. Stowage bin 110 also comprises interior 130, accessible via face panel 108. The preceding subject matter of this paragraph characterizes example 44 of the present disclosure.

Method 1400 enables acoustic excitation of face panel 108 of stowage bin 110 via electroacoustic transducer 114, positioned therein. Implementing method 1500 enables utilization of other surfaces inside vehicle 102 for other functionalities. Face panel 108 is movably coupled to mounting structure 112, allowing for access to interior 130 of stowage bin 110.

For example, electroacoustic transducer 114 integrated in face panel 108 allows surfaces previously utilized for flat-panel speaker technology to be repurposed for other functions, such as providing a high-definition display inside vehicle 102. By positioning electroacoustic transducer 114 in face panel 108 of stowage bin 110, media system 100 allows face panel 108 of stowage bin 110 to function as a flat-panel speaker while also providing access to interior 130 of stowage bin 110

Referring generally to FIG. 1 and particularly to, e.g., FIGS. 14A-14C, method 1400 further comprises (block 1404) moving face panel 108 of stowage bin 110 between, inclusively, a first position relative to mounting structure 112 of stowage bin 110 and a second position relative to mounting structure 112. The preceding subject matter of this paragraph characterizes example 45 of the present disclosure, wherein example 45 also includes the subject matter according to example 44, above.

When in the first position, face panel 108 of stowage bin 110 is configured to retain items 131 within interior 130 of stowage bin 110. When in the second position, face panel 108 of stowage bin 110 is configured to provide access to interior 130 of stowage bin 110. Allowing face panel 108 of stowage bin 110 to move between a first position relative to mounting structure 112 of stowage bin and second position relative to mounting structure 112 allows face panel 108 of stowage bin 110 to function as a flat-panel speaker while also providing access to interior 130 of stowage bin 110. Electroacoustic transducer 114 integrated in face panel 108 of stowage bin 110 allows face panel 108 to retain the item-securing functionality of stowage bin 110 when face panel 108 is moved between a first position relative to mounting structure 112 of stowage bin and second position relative to mounting structure 112.

Referring generally to FIG. 1 and particularly to, e.g., FIGS. 14A-14C, method 1400 further comprises (block 1406) providing a first electrical signal to attenuator 126 from audio source 124, operatively coupled to attenuator 126. Method 1500 also comprises (block 1408) providing a second electrical signal to electroacoustic transducer 114 from attenuator 126, operatively coupled to electroacoustic transducer 114. The preceding subject matter of this paragraph characterizes example 46 of the present disclosure, wherein example 46 also includes the subject matter according to example 45, above.

Use of media systems, such as media system 100 including attenuator 126, allows for a second electrical signal, that may be different from a first electrical signal provided by audio source 124 to attenuator 126, to be provided to electroacoustic transducer 114. For example, when audio source 124 provides a first electrical signal to attenuator 126, attenuator 126 provides a second electrical signal to electroacoustic transducer 114. Use of attenuator 126 allows attenuated electrical signals, different from the first electrical signal sent from audio source 124, to drive electroacoustic transducer 114.

Accelerometer 116 is integrated into face panel 108 of stowage bin 110 and operatively coupled to attenuator 126. When coupled with attenuator 126, accelerometer 116 allows attenuated electrical signals to drive electroacoustic transducer 114 based on output from accelerometer 116 to attenuator 126.

Referring generally to FIG. 1 and particularly to, e.g., FIGS. 14A-14C, method 1400 further comprises (block 1410) responsive to a location of face panel 108 between, inclusively, the first position of face panel 108 relative to mounting structure 112 and the second position of face panel 108 relative to mounting structure 112, generating output by accelerometer 116, integrated into face panel 108 of stowage bin 110 and operatively coupled to attenuator 126. The preceding subject matter of this paragraph characterizes example 47 of the present disclosure, wherein example 47 also includes the subject matter according to example 46, above.

By configuring accelerometer 116 to generate output responsive to a location of face panel 108 of stowage bin 110, attenuator 126 can provide an electrical signal to electroacoustic transducer 114 based on a location of face panel 108 relative to mounting structure 112. When coupled with attenuator 126, accelerometer 116 allows different electrical signals to drive electroacoustic transducer 114 based a location of face panel 108 relative to mounting structure 112.

In one illustrative example, accelerometer 116 may be a multiaxis accelerometer, capable of measuring acceleration in multiple directions. In this manner, accelerometer 116 detects acceleration as a vector quantity, and can be used to sense orientation of accelerometer 116. When integrated into face panel 108 of stowage bin 110, accelerometer 116 allows for the determination of a position of face panel 108, including, inclusively, the first position of face panel 108 relative to mounting structure 112 and the second position of face panel 108 relative to mounting structure 112.

Referring generally to FIG. 1 and particularly to, e.g., FIGS. 14A-14C, according to method 1400, providing the second electrical signal to electroacoustic transducer 114 from attenuator 126, operatively coupled to electroacoustic transducer 114 comprises, (block 1412) when face panel 108 is in the first position relative to mounting structure 112, providing electroacoustic transducer 114 with the second electrical signal that is not attenuated relative to the first electrical signal based on the location of face panel 108 relative to mounting structure 112. Providing the second electrical signal to electroacoustic transducer 114 from attenuator 126 also comprises, (block 1414) when face panel 108 is in the second position relative to mounting structure 112, providing electroacoustic transducer 114 with the second electrical signal that is attenuated relative to the first electrical signal based at least on the location of face panel 108 relative to mounting structure 112. The preceding subject matter of this paragraph characterizes example 48 of the present disclosure, wherein example 48 also includes the subject matter according to example 47, above.

Use of accelerometer 116 integrated into face panel 108 of stowage bin 110 allows attenuator 126 to provide different electrical signals based on position of face panel 108 relative to mounting structure 112. In one illustrative example, when face panel 108 is in the first position relative to mounting structure 112, attenuator 126 provides an electrical signal that is not attenuated relative to the first electrical signal from audio source 124 based on the location of face panel 108. In another illustrative example, when face panel 108 is in the second position relative to mounting structure 112, attenuator 126 provides an electrical signal that is attenuated relative to the first signal from audio source 124 based on the location of face panel 108. In this manner, accelerometer 116 allows media system 100 to provide attenuated audio to vehicle 102 based on a position of face panel 108 relative to mounting structure 112.

Referring generally to FIG. 1 and particularly to, e.g., FIGS. 14A-14C, method 1400 further comprises (block 1416) linearly attenuating the second electrical signal, communicated from attenuator 126 to electroacoustic transducer 114, relative to the first electrical signal, communicated from audio source 124 to attenuator 126, as face panel 108 of stowage bin 110 is moved with respect to mounting structure 112 of stowage bin 110 between, exclusively, the first position of face panel 108 relative to mounting structure 112 and, inclusively, the second position of face panel 108 relative to mounting structure 112. The preceding subject matter of this paragraph characterizes example 49 of the present disclosure, wherein example 49 also includes the subject matter according to example 48, above.

In one illustrative example, attenuator 126 linearly attenuates the second electrical signal relative to the first electrical signal as face panel 108 of stowage bin 110 is moved between the first position and the second position. A linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 14A-14C, method 1400 further comprises (block 1418) non-linearly attenuating the second electrical signal, communicated from attenuator 126 to electroacoustic transducer 114, relative to the first electrical signal, communicated from audio source 124 to attenuator 126, as face panel 108 of stowage bin 110 is moved with respect to mounting structure 112 of stowage bin 110 between, exclusively, the first position of face panel 108 relative to mounting structure 112 and, inclusively, the second position of face panel 108 relative to mounting structure 112. The preceding subject matter of this paragraph characterizes example 50 of the present disclosure, wherein example 50 also includes the subject matter according to example 48, above.

Referring generally to FIG. 1 and particularly to, e.g., FIGS. 14A-14C, exciting face panel 108 according to block 1402 of method 1400 further comprises (block 1420) using electroacoustic transducer 114 to excite face panel 108 based on the second electrical signal, communicated from attenuator 126 to electroacoustic transducer 114. Face panel 108 is configured to retain items 131 within interior 130 of stowage bin 110 when face panel 108 of stowage bin 110 is in the first position relative to mounting structure 112. Face panel 108 is configured to provide access to interior 130 of stowage bin 110 when face panel 108 is in the second position relative to mounting structure 112. The preceding subject matter of this paragraph characterizes example 51 of the present disclosure, wherein example 51 also includes the subject matter according to any one of examples 48 to 50, above.

In one illustrative example, attenuator 126 non-linearly attenuates the second electrical signal relative to the first electrical signal as face panel 108 of stowage bin 110 is moved between the first position and the second position. A non-linear attenuation of the second electrical signal provides a gradual adjustment to the attenuation of the electrical signal as face panel 108 of stowage bin 110 is moved between the first position and the second position.

Referring generally to FIG. 1 and particularly to, e.g., FIGS. 14A-14C, method 1400 further comprises (block 1422) providing an input to attenuator 126 from item detector 132, operatively coupled to attenuator 126, indicating whether items 131 are present within interior 130 of stowage bin 110. The preceding subject matter of this paragraph characterizes example 52 of the present disclosure, wherein example 52 also includes the subject matter according to example 51, above.

Exciting face panel 108 of stowage bin 110 based on the second electrical signal provides for selective excitement of face panel 108 by electroacoustic transducer 114 relative to the electrical signal received from attenuator 126. In this manner, a media system, such as media system 100, can provide different excitation of face panel 108 of stowage bin 110 based on the position of face panel 108. For example, electroacoustic transducer 114 can selectively excite face panel 108 according to a second electrical signal when face panel 108 is in second position relative to mounting structure 112.

Referring generally to FIG. 1 and particularly to, e.g., FIGS. 14A-14C, according to method 1400, (block 1424) when items 131 are present within interior 130 of stowage bin 110, the second electrical signal, not attenuated relative to the first electrical signal based at least in part on items 131 being present within interior 130 of stowage bin 110, is communicated from attenuator 126 to electroacoustic transducer 114. Additionally, (block 1426) when items 131 are absent from interior 130 of stowage bin 110, the second electrical signal, attenuated relative to the first electrical signal based on items 131 being present within interior 130 of stowage bin 110, is communicated from attenuator 126 to electroacoustic transducer 114. The preceding subject matter of this paragraph characterizes example 53 of the present disclosure, wherein example 53 also includes the subject matter according to example 52, above.

Item detectors, such as item detector 132, may be incorporated into stowage bin 110. Item detector 132 indicates to attenuator 126 whether items 131 are present within interior 130 of stowage and 110. By configuring item detector 132 to generate output responsive to the presence of items 131 which in interior 130 of stowage bin 110, attenuator 126 can provide an electrical signal to electroacoustic transducer 114 based on the presence of items 131 within interior 130 of stowage bin 110. When coupled with attenuator 126, item detector 132 allows different electrical signals to drive electroacoustic transducer 114 based the presence of items 131 within interior 130 of stowage bin 110.

Referring generally to FIG. 1 and particularly to, e.g., FIGS. 14A-14C, method 1400 further comprises (block 1428) adjusting the output of accelerometer 116 with low-pass filter 128, operatively coupled to accelerometer 116. Low-pass filter 128 is configured to adjust the output of accelerometer 116 based on acceleration of vehicle 102. The preceding subject matter of this paragraph characterizes example 54 of the present disclosure, wherein example 54 also includes the subject matter according to any one of examples 47 to 53, above.

When operatively coupled to accelerometer 116, low-pass filter 128 allows media system 100 to adjust the output of accelerometer 116 based on acceleration of vehicle 102. In this manner, low-pass filter 128 prevents inadvertent attenuation or non-attenuation of the first electrical signal based due to accelerometer 116 detecting acceleration of vehicle 102.

Examples of the present disclosure may be described in the context of aircraft manufacturing and service method 1500 as shown in FIG. 15 and aircraft 1600 as shown in FIG. 16. During pre-production, illustrative method 1500 may include specification and design block 1502 of aircraft 1600 and material procurement block 1504. During production, component and subassembly manufacturing block 1506 and system integration block 1508 of aircraft 1600 may take place. Thereafter, aircraft 1600 may go through certification and delivery block 1510 to be placed in service block 1512. While in service, aircraft 1600 may be scheduled for routine maintenance and service block 1514. Routine maintenance and service may include modification, reconfiguration, refurbishment, etc. of one or more systems of aircraft 1600.

Each of the processes of illustrative method 1500 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 16, aircraft 1600 produced by illustrative method 1500 of FIG. 15 may include airframe 1602 with a plurality of high-level systems 1604 and interior 1606. Examples of high-level systems 1604 include one or more of propulsion system 1608, electrical system 1610, hydraulic system 1612, and environmental system 1614. Any number of other systems may be included. Although an aerospace example is shown, the principles disclosed herein may be applied to other industries, such as the automotive industry. Accordingly, in addition to aircraft 1600, the principles disclosed herein may apply to other vehicles, e.g., land vehicles, marine vehicles, space vehicles, etc.

Apparatuses and methods shown or described herein may be employed during any one or more of the stages of the manufacturing and service method 1500. For example, components or subassemblies corresponding to component and subassembly manufacturing block 1506 may be fabricated or manufactured in a manner similar to components or subassemblies produced while aircraft 1600 is in service block 1512. Also, one or more examples of the apparatuses, methods, or combination thereof may be utilized during production stages 1506 and 1508, for example, by substantially expediting assembly of or reducing the cost of aircraft 1600. Similarly, one or more examples of the apparatus or method realizations, or a combination thereof, may be utilized, for example and without limitation, while aircraft 1600 is in in service block 1512 and/or during maintenance and service block 1514.

Different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A vehicle comprising:
   a chassis;
   a passenger compartment, comprising ceiling panels;
   a stowage bin in the passenger compartment, the stowage bin comprising:
      a mounting structure that is stationary relative to the chassis;
      a face panel, movably coupled to the mounting structure; and
      an interior, accessible via the face panel; and
   a media system, comprising:
      a high-definition display system, integrated into the ceiling panels;
      an audio source, operatively coupled with the high-definition display system;
      an electroacoustic transducer, integrated into the face panel of the stowage bin;
      an attenuator, operatively coupled to the electroacoustic transducer;
      an accelerometer, integrated into the face panel of the stowage bin and operatively coupled to the attenuator; and wherein:
   the audio source is configured to provide a first electrical signal to the attenuator;
   the attenuator is configured to provide a second electrical signal to the electroacoustic transducer; and
   the face panel of the stowage bin is capable of being moved between, inclusively, a first position relative to the mounting structure of the stowage bin and a second position relative to the mounting structure.

2. The vehicle according to claim 1, wherein the accelerometer is configured to generate output responsive to a location of the face panel of the stowage bin between, inclusively, the first position of the face panel relative to the mounting structure and the second position of the face panel relative to the mounting structure.

3. The vehicle according to claim 2, wherein:
   when the face panel is in the first position relative to the mounting structure, the attenuator provides the electroacoustic transducer with the second electrical signal that is not attenuated relative to the first electrical signal, communicated from the audio source to the attenuator, based on the location of the face panel relative to the mounting structure; and
   when the face panel is in the second position relative to the mounting structure, the attenuator provides the electroacoustic transducer with the second electrical signal that is attenuated relative to the first electrical signal, communicated from the audio source to the attenuator, based on the location of the face panel relative to the mounting structure.

4. The vehicle according to claim 2, wherein, responsive to the face panel of the stowage bin being moved with respect to the mounting structure of the stowage bin between, exclusively, the first position of the face panel relative to the mounting structure and, inclusively, the second position of the face panel relative to the mounting structure, the second electrical signal, communicated from the attenuator to the electroacoustic transducer, is linearly attenuated relative to the first electrical signal, communicated from the audio source to the attenuator.

5. The vehicle according to claim 2, wherein, responsive to the face panel of the stowage bin being moved with respect to the mounting structure of the stowage bin between, exclusively, the first position of the face panel relative to the mounting structure and, inclusively, the second position of the face panel relative to the mounting structure, the second electrical signal, communicated from the attenuator to the electroacoustic transducer, is non-linearly attenuated relative to the first electrical signal, communicated from the audio source to the attenuator.

6. The vehicle according to claim 2, wherein the electroacoustic transducer is configured to excite the face panel of the stowage bin based on the second electrical signal, communicated from the attenuator to the electroacoustic transducer.

7. The vehicle according to claim 6, wherein:
   the face panel of the stowage bin is configured to retain items within the interior of the stowage bin when the face panel is in the first position; and the face panel is configured to provide access to the interior of the stowage bin when the face panel is in the second position.

8. The vehicle according to claim 7, wherein:
the stowage bin further comprises an item detector, operatively coupled to the attenuator; and
the item detector is configured to provide an input to the attenuator indicating whether the items are present within the interior of the stowage bin.

9. The vehicle according to claim 8, wherein:
when the items are present within the interior of the stowage bin, the input from the item detector causes the attenuator to provide the electroacoustic transducer with the second electrical signal that is not attenuated, at least based on the input from the item detector to the attenuator, relative to the first electrical signal, communicated from the audio source to the attenuator; and
when the items are absent from the interior of the stowage bin, the attenuator provides the electroacoustic transducer with the second electrical signal that is attenuated, based on the input from the item detector to the attenuator, relative to the first electrical signal, communicated from the audio source to the attenuator.

10. The vehicle according to claim 2, further comprising a low-pass filter, operatively coupled to the accelerometer, wherein the low-pass filter is configured to adjust the output of the accelerometer based on acceleration of the vehicle.

11. The vehicle according to claim 1, wherein:
a cover plate is secured to an interior surface of the face panel of the stowage bin;
a torque tube is retained between the cover plate and the face panel; and
the electroacoustic transducer is retained between the cover plate and the face panel.

12. The vehicle according to claim 11, wherein the cover plate further comprises a retainer, configured to locate the electroacoustic transducer along the cover plate.

13. The vehicle according to claim 12, wherein the retainer comprises one of a locating post, a recessed seat, a resilient finger, or any combination thereof.

14. The vehicle according to claim 12, wherein the electroacoustic transducer further comprises:
a permanent magnet, located relative the cover plate by the retainer; and
an electromagnet, connected to the interior surface of the face panel and in contact with the permanent magnet.

15. The vehicle according to claim 11, wherein the cover plate further comprises:
a first area, located proximally to the electroacoustic transducer, wherein the first area has a first locally tailored physical characteristic selected to provide an acoustic property; and
a second area, located distally from the electroacoustic transducer, wherein a second physical characteristic of the second area is different from the first locally tailored physical characteristic of the first area.

16. The vehicle according to claim 11, further comprising a sound-insulation layer, positioned over at least a portion of the cover plate to acoustically isolate the electroacoustic transducer from the interior of the stowage bin.

17. A method of acoustically exciting a face panel of a stowage bin inside a vehicle, wherein the method comprises:
providing a first electrical signal to an attenuator from an audio source, operatively coupled to the attenuator;
providing a second electrical signal to an electroacoustic transducer, integrated into the face panel of the stowage bin, from the attenuator, operatively coupled to the electroacoustic transducer;
exciting the face panel with the electroacoustic transducer;
responsive to a location of the face panel between, inclusively, a first position of the face panel relative to a mounting structure and a second position of the face panel relative to the mounting structure, generating output by an accelerometer, integrated into the face panel of the stowage bin and operatively coupled to the attenuator;
wherein the stowage bin further comprises:
the mounting structure that is stationary relative to a chassis of the vehicle; and
an interior, accessible via the face panel.

18. The method according to claim 17, further comprising:
moving the face panel of the stowage bin between, inclusively, the first position relative to the mounting structure of the stowage bin and the second position relative to the mounting structure.

19. The method according to claim 17, wherein providing the second electrical signal to the electroacoustic transducer from the attenuator, operatively coupled to the electroacoustic transducer, comprises:
when the face panel is in the first position relative to the mounting structure, providing the electroacoustic transducer with the second electrical signal that is not attenuated relative to the first electrical signal based on the location of the face panel relative to the mounting structure; and
when the face panel is in the second position relative to the mounting structure, providing the electroacoustic transducer with the second electrical signal that is attenuated relative to the first electrical signal based at least on the location of the face panel relative to the mounting structure.

20. The method according to claim 17, further comprising:
linearly attenuating the second electrical signal, communicated from the attenuator to the electroacoustic transducer, relative to the first electrical signal, communicated from the audio source to the attenuator, as the face panel of the stowage bin is moved with respect to the mounting structure of the stowage bin between, exclusively, the first position of the face panel relative to the mounting structure and, inclusively, the second position of the face panel relative to the mounting structure.

21. The method according to claim 17, further comprising:
non-linearly attenuating the second electrical signal, communicated from the attenuator to the electroacoustic transducer, relative to the first electrical signal, communicated from the audio source to the attenuator, as the face panel of the stowage bin is moved with respect to the mounting structure of the stowage bin between, exclusively, the first position of the face panel relative to the mounting structure and, inclusively, the second position of the face panel relative to the mounting structure.

22. The method according to claim 17, wherein:
exciting the face panel further comprises using the electroacoustic transducer to excite the face panel based on the second electrical signal, communicated from the attenuator to the electroacoustic transducer;

the face panel is configured to retain items within the interior of the stowage bin when the face panel of the stowage bin is in the first position relative to the mounting structure; and the face panel is configured to provide access to the interior of the stowage bin when the face panel is in the second position relative to the mounting structure.

23. The method according to claim 22, further comprising providing an input to the attenuator from an item detector, operatively coupled to the attenuator, wherein the input indicates whether the items are present within the interior of the stowage bin.

24. The method according to claim 23, wherein:

when the items are present within the interior of the stowage bin, the second electrical signal, attenuated relative to the first electrical signal based at least in part on the items being present within the interior of the stowage bin, is communicated from the attenuator to the electroacoustic transducer; and when the items are absent from the interior of the stowage bin, the second electrical signal, not attenuated relative to the first electrical signal based on the items being present within the interior of the stowage bin, is communicated from the attenuator to the electroacoustic transducer.

25. The method according to claim 17, further comprising:

adjusting the output of the accelerometer with a low-pass filter, operatively coupled to the accelerometer, based on acceleration of the vehicle.

* * * * *